US012534290B2

(12) United States Patent
Zak

(10) Patent No.: US 12,534,290 B2
(45) Date of Patent: Jan. 27, 2026

(54) TRASH BIN

(71) Applicant: KETER HOME AND GARDEN PRODUCTS LTD, Herzliya (IL)

(72) Inventor: Zvika Zak, Herzliya (IL)

(73) Assignee: KETER HOME AND GARDEN PRODUCTS LTD, Herzliya (IL)

( * ) Notice: Subject to any disclaimer, the term of this patent is extended or adjusted under 35 U.S.C. 154(b) by 305 days.

(21) Appl. No.: 18/039,680

(22) PCT Filed: Dec. 2, 2021

(86) PCT No.: PCT/IL2021/051435

§ 371 (c)(1),
(2) Date: May 31, 2023

(87) PCT Pub. No.: WO2022/118318

PCT Pub. Date: Jun. 9, 2022

(65) Prior Publication Data

US 2024/0025635 A1 Jan. 25, 2024

(30) Foreign Application Priority Data

Dec. 2, 2020 (IL) .......................................... 279162

(51) Int. Cl.

*B65F 1/16* (2006.01)
*B65F 1/06* (2006.01)
*B65F 1/14* (2006.01)

(52) U.S. Cl.

CPC .............. *B65F 1/06* (2013.01); *B65F 1/1426* (2013.01)

(58) Field of Classification Search

CPC .. B65F 1/068; B65F 1/06; B65F 1/163; B65F 1/1426; B65F 1/16; B65F 1/1615; B65F 1/1607; B65F 1/1468; B65F 1/1623; B65F 2210/148; B65F 2210/101

USPC ........... 220/495.08, 495.11, 908, 23.86, 263, 220/4.09, 495.06

See application file for complete search history.

(56) References Cited

U.S. PATENT DOCUMENTS

| | | | |
|---|---|---|---|
| 1,007,909 | A | 11/1911 | Angermeier |
| 3,451,582 | A | 6/1969 | Morgan |
| D340,559 | S | 10/1993 | Taylor |
| D351,697 | S | 10/1994 | Blotnick |

(Continued)

FOREIGN PATENT DOCUMENTS

| | | |
|---|---|---|
| CN | 110077754 | 8/2019 |
| EP | 3042864 A1 | 7/2016 |

(Continued)

OTHER PUBLICATIONS

Keter Delivery box, announced Dec. 2019 [online], [site visited Mar. 18, 2023]. Avail from int, URL: https://www.amazon.com/Keter-Package-Delivery-Lockable-Compartment/dp/B07RJ6QHCH/ref=asc_df_B07RJ6QHCH/ (Year: 2019).

(Continued)

*Primary Examiner* — King M Chu
(74) *Attorney, Agent, or Firm* — Maschoff Brennan

(57) ABSTRACT

A trash bin comprising a body having side walls, a top lid, a front door, and a garbage bag holding arrangement extending over a top portion of the front door and over a top portion of the side walls, wherein a garbage bag can be removed through the front door.

20 Claims, 20 Drawing Sheets

(56) References Cited

U.S. PATENT DOCUMENTS

| | | | | |
|---|---|---|---|---|
| 5,984,134 | A * | 11/1999 | Mario | B65F 1/06 220/495.11 |
| 6,179,151 | B1 | 1/2001 | Radvansky | |
| D507,687 | S | 7/2005 | Moon et al. | |
| 8,074,824 | B1 | 12/2011 | Roby-Wilson | |
| D688,806 | S | 8/2013 | Phillips et al. | |
| D760,979 | S | 7/2016 | Chang | |
| D914,401 | S | 3/2021 | Leng | |
| D914,404 | S | 3/2021 | Xiao | |
| D936,323 | S | 11/2021 | Blitzer et al. | |
| D941,541 | S | 1/2022 | Li | |
| D955,979 | S | 6/2022 | Zhao | |
| D965,393 | S | 10/2022 | Zhou | |
| D965,820 | S | 10/2022 | Anderson et al. | |
| D971,542 | S | 11/2022 | Xiao | |
| D981,674 | S | 3/2023 | Xiao | |
| D985,975 | S | 5/2023 | Xiao | |
| D1,004,879 | S | 11/2023 | Ben-Avi | |
| D1,014,894 | S | 2/2024 | Xiao | |
| D1,023,498 | S | 4/2024 | Mou | |
| D1,041,888 | S | 9/2024 | Xu | |
| 2005/0016999 | A1 | 1/2005 | Richardson et al. | |
| 2013/0048641 | A1 | 2/2013 | Romano | |
| 2014/0246439 | A1 | 9/2014 | Friedman | |
| 2014/0346175 | A1* | 11/2014 | Merey | B65F 1/08 220/263 |
| 2015/0375934 | A1* | 12/2015 | Reiser | B65F 1/1607 53/474 |
| 2020/0031573 | A1 | 1/2020 | Walker | |
| 2024/0025635 | A1 | 1/2024 | Zak | |

FOREIGN PATENT DOCUMENTS

| | | |
|---|---|---|
| KR | 200375826 | 3/2005 |
| KR | 20160025725 | 3/2016 |
| WO | 2009114495 | 9/2009 |

OTHER PUBLICATIONS

Suncast, announced 2012 [online], [site visited Mar. 18, 2023]. Avail from int, URL: https://www.acehardware.com/departments/home-and-decor/trash-and-recycling/garbage-cans-and-recycling-bins/7268600 (Year: 2012).

East Oak, announced Feb. 2024 [online], [site visited Jan. 2, 2025]. Avail from int, URL: https://www.amazon.com/.

* cited by examiner

TRASH BIN

TECHNOLOGICAL FIELD

The present disclosure is directed to a trash bin. More particularly the disclosure is concerned with trash bin configured with a front door.

BACKGROUND ART

References considered to be relevant as background to the presently disclosed subject matter are listed below:

CN110077754

U.S. Pat. No. 8,074,824

Acknowledgement of the above references herein is not to be inferred as meaning that these are in any way relevant to the patentability of the presently disclosed subject matter.

BACKGROUND

CN110077754 provides a waste bin capable of changing a bag automatically, the waste bin comprises a bin body with an upper opening and a bin lid, wherein the waste bin further comprises a square-shaped support seat, a waste bag guide rail, a positioning support member, a front distracting assembly, a rear elastic blocking piece, a waste bag and a front door body; the rear rail of the waste bag guide rail is detachably connected or pivoted with a connecting seat; the positioning support member is arranged at the front end of the side wall plate of the bin body, and the longitudinal rod of the waste bag guide rail matches with the positioning support member; the upper end of the bin body is inserted into an inserting slot and can be matched detachably, the waste bag is arranged in a storage space of the waste bag, and the longitudinal rod passes through a sliding guide hole of the waste bag; under the using state, the rear elastic blocking piece stretches into the waste bag and fits with the inner surface of the back bag wall panel of the waste bag, and the front distracting assembly matches with the inner surface of the front bag wall panel. The stacked waste bags are arranged in the waste bag storage space, and the waste bag is opened, the front distracting assembly is matched with the front bag wall panel of the waste bag, and the rear elastic blocking piece is matched with the back bag wall panel, and when the front bag is taken out, the next bag is replenished automatically; and the waste bin is easy to use.

U.S. Pat. No. 8,074,824 discloses a trash receptacle apparatus comprising a first vertical pole, a second vertical pole, a third vertical pole, a fourth vertical pole, a first top bar, a second top bar, a third top bar, a fourth top bar, a first roller pole, a second roller pole, a third roller pole, a fourth roller pole, and a base wherein the poles and base altogether form a frame; a housing for temporarily enclosing the frame; and a plurality of wheel disposed on the bottom panel; wherein a trash bag can be folded over the top poles; wherein a user can pull the trash bag out of the trash receptacle apparatus through the frame without having to lift the trash bag above the trash receptacle apparatus.

GENERAL DESCRIPTION

The present disclosure is concerned with a trash bin comprising a body having side walls, a top lid, a front door, and a garbage bag holding arrangement extending over a top portion of the front door and over a top portion of the side walls, wherein a garbage bag can be removed through the front door.

According to the present disclosure there is provided a trash bin comprising a solid body configured with side walls and a front door, said side walls and front door having top edges defining together a top opening into a garbage space of the bin; said front door being displaceable between a closed position and an open position; a top lid articulated at a top portion of the body and pivotally displaceable between a closed position bearing over the top opening, and an open position exposing said top opening and providing access into said garbage space; and a bag holding assembly comprising a rear bag-holder extending over at least a back portion of the top opening, and a door bag-holder extending over at least the door portion of the top opening.

According to a first embodiment of the present disclosure, the rear bag-holder and the door bag-holder are bars articulated at a top portion of opposite side walls and are swingable about parallelly extending axes between a garbage-bag clamping position wherein the rear bag-holder bar bears over top portions of the respective side walls and the door bag-holder bar bears over a top portion of the front door; and configurable for clamping portions of an opening of a garbage bag, and a bag releasing position wherein the rear bag-holder and the door bag-holder are disposed to disengage from the respective top portion.

According to a second configuration of the present disclosure there is a lid assembly comprising a bag holder articulable over the top edge of the body and configured with a bag holder opening and a bag clamping arrangement at a bottom face of thereof, said bag holder being displaceable between a bag holding position and an open position; wherein at the bag holding position the bag clamping arrangement of the bag holder bears over at least portions of a bag mount configured at the top edge of the side walls and a front bag mount.

The arrangement is such that a garbage bag can be securely disposed within the garbage space, with an opening of the garbage bag facing the bag holder opening, and wherein a top edge of the garbage bag is clamped between at least portions of the bag mount and corresponding at least portions of the bag clamping arrangement.

The front bag mount can be part of a frame member extending between front edges of the side walls, or the front bag mount can be configured at a top edge of the front door.

A friction path extends between the bag mount and portions of the bag clamping arrangement, so as to grip a garbage bag disposed within said path and prevent spontaneous sliding displacement thereof. The friction enhancing path can be configured with a friction enhancing arrangement for increasing friction forces of the garbage bag within said friction path.

According to a particular configuration of the disclosure, the bag holder is pivotally articulable at a top portion of the body.

According to yet an embodiment of the disclosure, the lid assembly further comprises a lid displaceable over the bag holder, between a closed position wherein the bag holder opening is closed, and an open position wherein the garbage space is accessible.

According to a particular configuration the lid is pivotally articulated to the bag holder, said lid displaceable between a closed position and an open position facilitating access to the garbage space.

The bag holder can further be configured with one or more thoroughgoing openings extending from a top portion face, laterally disposed with respect to the bag mount, said openings configured for tacking therein slack of a garbage bag.

Removing a garbage bag from a trash bin according to the present disclosure does not require lifting the bag but rather displacing the lid assembly into the open position, then opening the front door and removing the garbage bag from the garbage space through the open front door, without out having to lift the garbage bag.

Any one or more of the following features, designs and configurations can be applied to a trash bin according to the present disclosure, separately or in various combinations thereof:

The rear bag-holder and the door bag-holder can be pivotally articulated to the side walls about parallel axes extending parallel with the front door;

A top portion of the side walls and a top portion of the front door can be configured with a rim for accommodating the rear bag-holder and the door bag-holder at their garbage-bag clamping position;

One or both of the rear bag-holder, the door bag-holder and the top rim of the side walls and the front door can be configured with a garbage bag surface roughening, such as serrations, bulges, ribs etc.;

The front door can be opened only after opening the lid;

The front door can be displaced into an open position upon displacing the front bag holder into the bag releasing position;

The front door can be pivotally articulated to a side wall portion about a vertical axis;

The front door can be pivotably articulated to a front edge portion of a first side wall, and configured with a locking arrangement engageable with a front side edge of a second side wall;

The front door can be pivotally articulated at a bottom edge thereof and being tiltable into an open position;

The trash bin can have a polygonal shape (e.g. rectangle), or non-polygonal shapes (e.g. circular and oval);

The front door is hingedly articulated to an edge portion of a side wall, and is pivotally displaceable between its closed position and an open position;

The front door can coextend with the side walls of the body;

The front door can be pivotally articulated to a side edge of a side wall of the body;

The body can be configured with a bottom base;

The body can be configured with support legs;

The body can be configured with wheels;

One or both of the bag mount and the bag holder can be configured with one or more garbage bag grips. The bag grips can be prongs or rib-like elements;

At a closed position of the front door the bag mount of the side walls and the bag mount of the front door coextend;

At a closed position of the front door the bag mount can be assume an annular frame shape;

The bag clamping arrangement of the bag holder can be configured as a bag arresting lip, corresponding with a bearing lip of the bag mount;

The bag arresting lip and the bearing lip can be curved;

At the bag holding position the bag arresting lip bears over the bearing lip;

At the bag holding position portions of a garbage bag placed within the garbage bin are clamped between respective the bag arresting lip and the bearing lip;

At the bag holding position the bag holder opening of the bag holder is disposed over the top opening of the body, facilitating access into the garbage space;

The lid can be pivotally articulated to the bag holder or it can be pivotally articulated to a body portion of the bin;

A locking arrangement can be configured for securing the lid to the bag holder;

A locking arrangement can be configured for securing the bag holder to the bag mount of the body;

A locking arrangement can be configured for securing the door at a closed position;

The door locking mechanism is normally locked;

The bag mount and the bag clamping arrangement can be continuous or intermitted;

The bag mount can be integral with respective top portion of the side walls and a top portion of the front door, or it can be integrated therewith;

The coextending bag mounts give rise to an annular support for the bag holder;

The friction enhancing arrangement within the friction path can be protuberances, humps, a labyrinth-like path, friction enhancing materials (e.g. rubber), etc.;

The trash bin can be polygonal;

The bin can be a pedal-bin, wherein the lid is displaceable into the open position by a foot operated pedal mechanism articulated to the lid;

The lid can be retained at a fully open position by a retention mechanism temporarily disengaging the lid from the pedal mechanism;

The pedal of the pedal mechanism can be displaceable between a stowed position at which it substantially does not project from a front face of the bin, and an operative position at which it projects from the front face of the bin;

At a closed position the lid can be configured for nesting within a shoulder of the top edge of the side walls and front door of the bin.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 2:
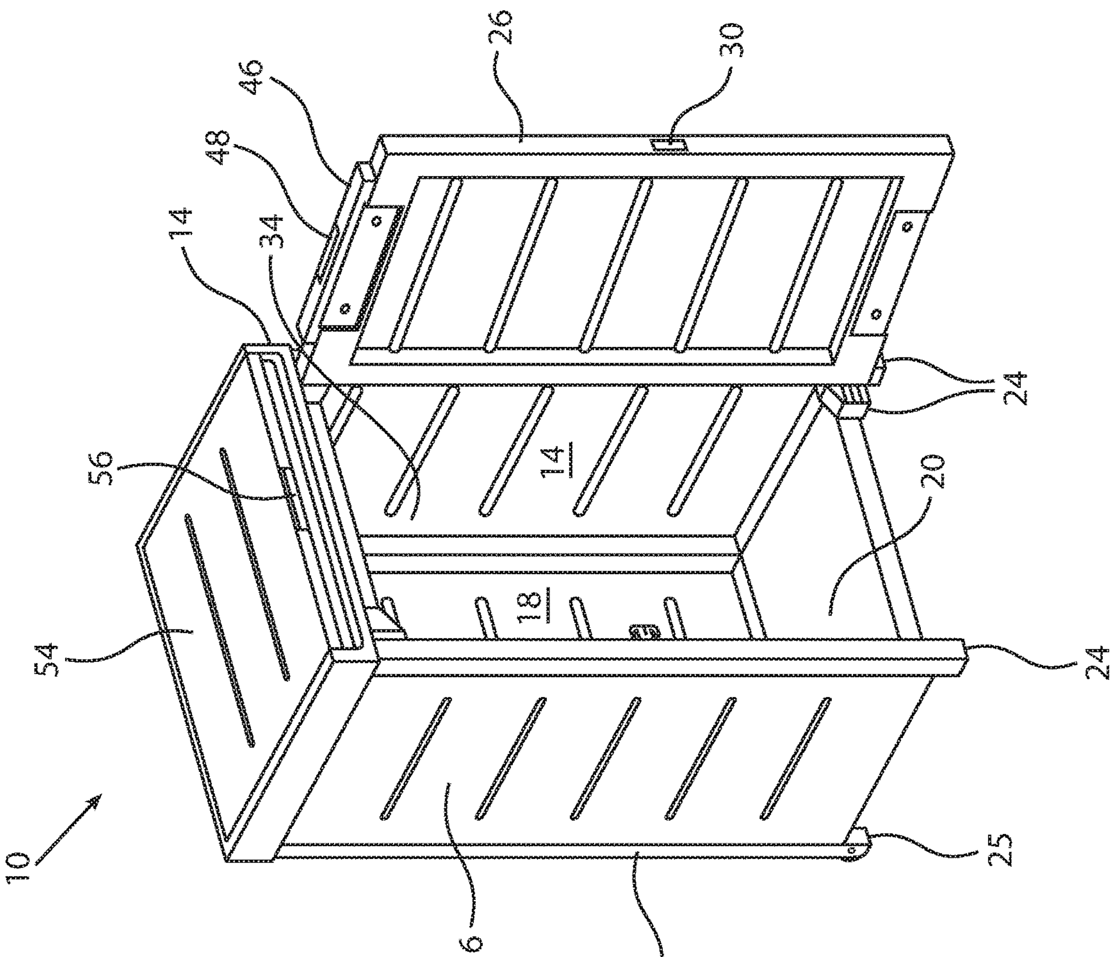
FIG. 2 illustrates the trash bin of FIG. 1, with a front door thereof at an open position.
Figure 1:
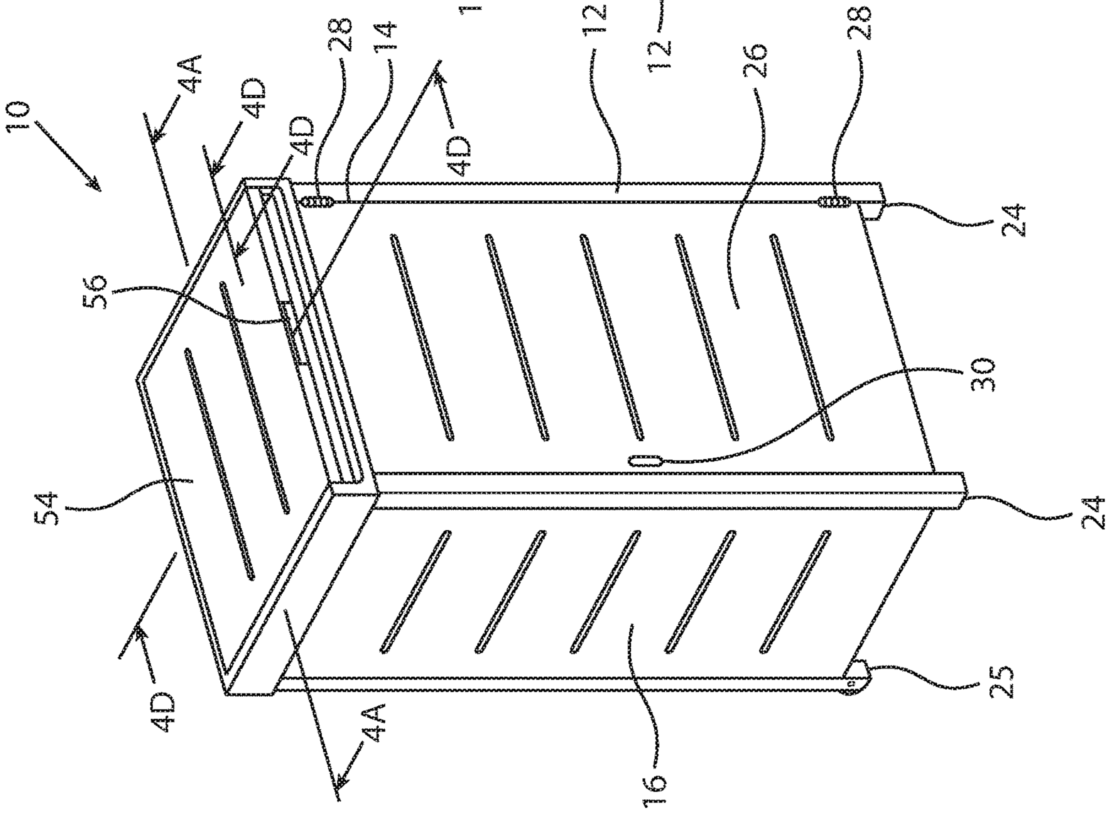
FIG. 1 is a top perspective view of a trash bin according to an example of the disclosure.

Attention is directed to FIGS. 1 and 2 of the drawings, directed to a trash bin according to an example of the disclosure, generally designated 10. The trash bin 10 has a polygonal shape (rectangle in the particular example, though other shapes are possible too, including non-polygonal shapes, e.g. circular), comprising a solid body 12 comprising two side walls 14 and 16, a back wall 18 and a base 20. The body 12 is supported over two front legs 24 and two rear wheels 25, wherein at an upright position the trash bin 10 is leveled over a surface and can easily be manipulated by the wheels.

A front door 26 is hingedly articulated at 28 to side wall 14, where said front door 26 is pivotable between a closed position (FIG. 1) and an open position (FIG. 2). The front door 26 can be arrested at the closed position owing to a locking latch 30.

The two side walls 14, 16, back wall 18, base 20 and front door 26 give rise to a garbage space 34.

Each of the side walls 14 and 16 and the back wall 18 has a top edge 38 (FIGS. 3B, 4C, 4D, 5B-5D), defining together a top opening 40 (FIGS. 3B, 5B-5D) into the garbage space 34. The top edge of the walls is further configured with a bag mount 44 (FIGS. 3B, 4B, 4C, 5D) shaped as a lip-like portion projecting upwards from the top edge 38 and curved inwardly into the top opening 40. In the present example the bag mount 44 continuously extends over the top edge 38 of the walls. The front door 26 too is configured at a top edge thereof with a bag mount portion 46 (FIGS. 2, 3B, 5B), wherein at the closed position of the front door 26 the bag mount 44 of the side walls 14 and 16 coextends with bag mount portion 46 of the front door 26, such that when the front door 26 is closed the coextending bag mounts 44 and 46 give rise to an annular shaped support (FIG. 3B) for a bag holder, as will be discussed below.

The bag mounts 44 and 46 are each configured with one or more openings thoroughgoing openings 48 (FIGS. 2, 3B, 4B-4D, 5B, 5D), said openings extending from an outside face of the lip-shaped bag mounts 44 and 46 to the inside face thereof i.e., extending into the garbage space 34.

However, it is appreciated that the front bag mount can be part of a frame member extending between front edges of the side walls (instead of being configured at a top edge of the front door, as in the illustrated example).

The trash bin 10 is further configured with a lid assembly generally designated 50 comprising a bag holder 52 articulated at a top portion of the back wall 18 and being pivotally displaceable between an open position (FIGS. 3B, 5B-5D) and a closed, bag holding position (FIGS. 3A, 4C-4E, 5A). It is appreciated that the bag holder 52 can be articulated otherwise, including by a non-pivotal arrangement (not shown). The lid assembly 50 further comprises a lid 54 pivotally articulated to the bag holder 52, between a closed position (FIGS. 1, 2, 4A-4E) and an open position (FIGS. 3A, 5A), wherein a locking latch 56 is provided for maintaining the lid 54 closed also upon opening the bag holder 52 (as in FIG. 3B) and to prevent undesired opening of the trash bin, e.g. by animals).

A bottom face of the bag holder 52 is configured with a bag clamping arrangement, namely an annular downward and inwards facing curved lip 60 and defining a bag holder opening 64, curved in register with the bag mounts 44 and 46 and configured for bearing thereover. The arrangement is such that at bag holding position the bag holder 52 bears over the top edge 38 of the walls, with lip 60 of bag clamping arrangement bearing over bag mounts 44 and 46 and with bag holder opening 64 coinciding with top opening 40.

Figure 3B:
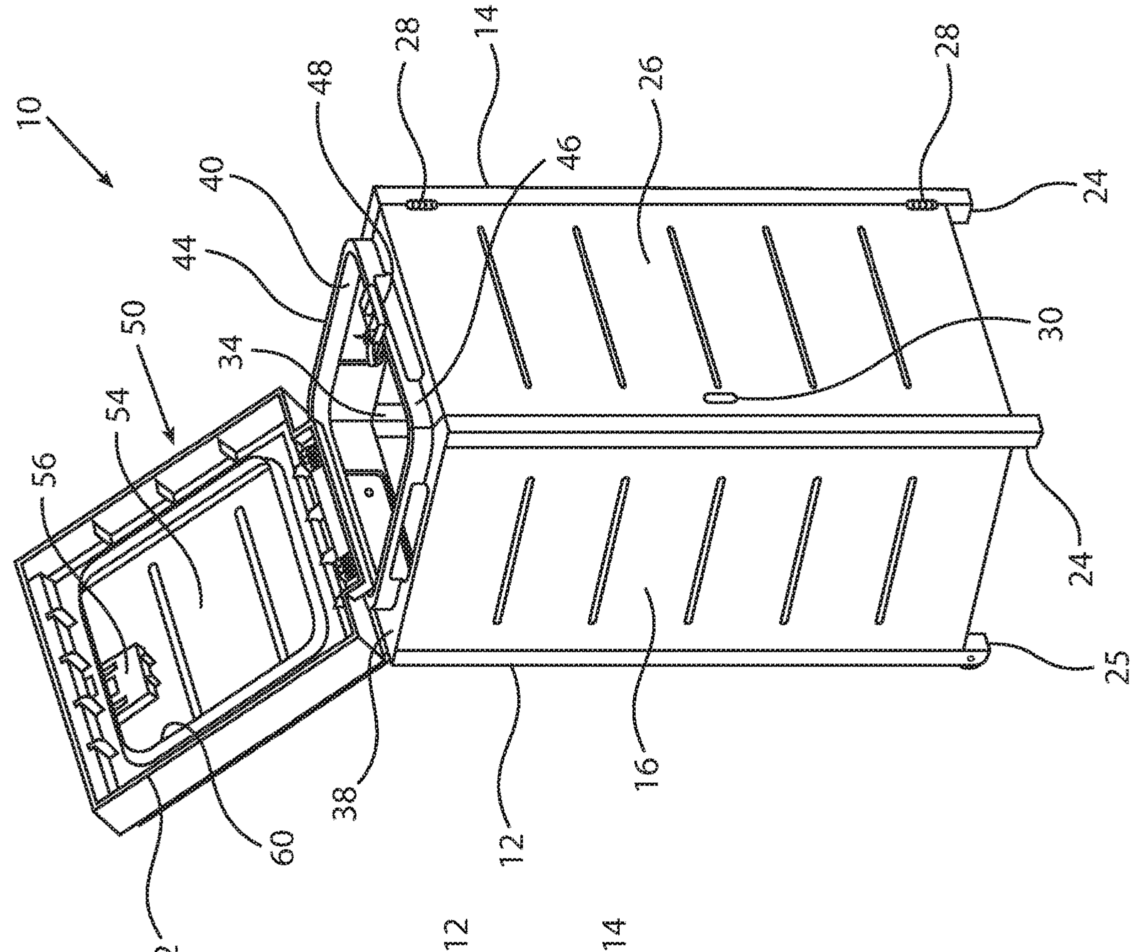
FIG. 3B illustrates the trash bin of FIG. 1, with a lid assembly at an open position.
Figure 3A:
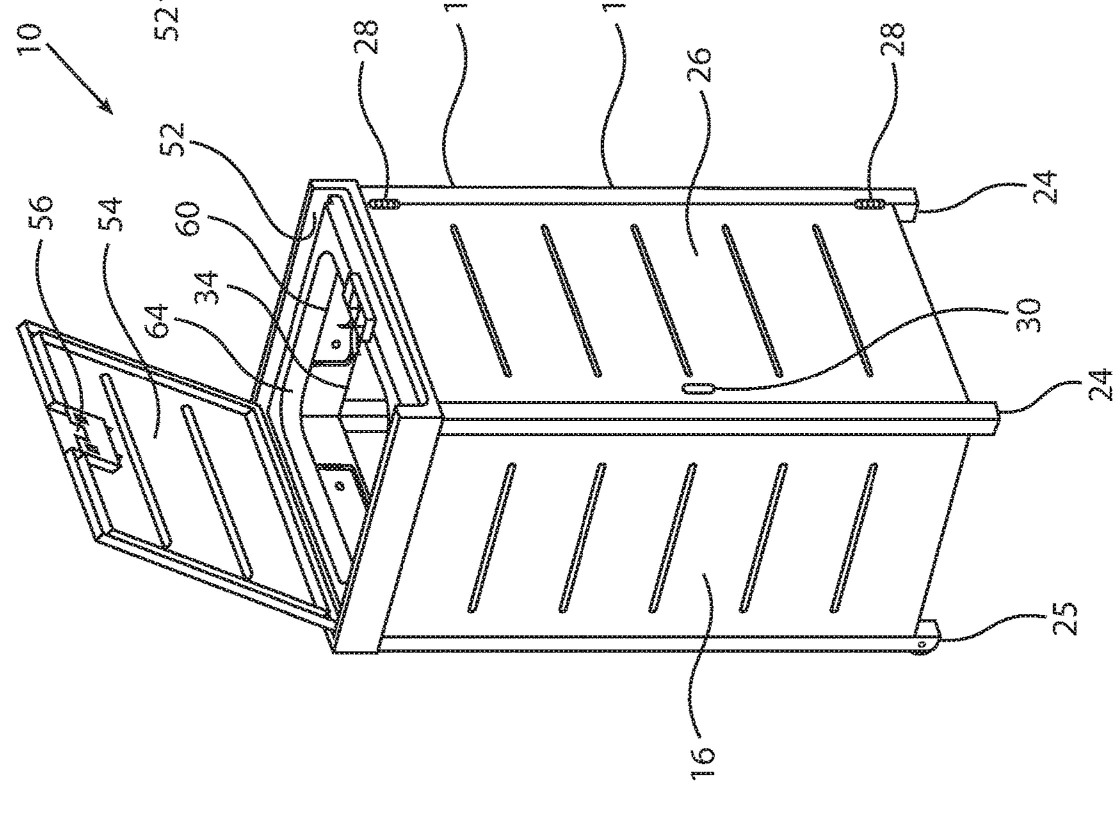
FIG. 3A illustrates the trash bin of FIG. 1, with a trash disposal lid at a partially open position.

Preparing the trash bin 10 for use takes place as follows: first, the lid assembly (namely bag holder 52 and lid 54) are displaced into the open position, with the front door 26 placed at the closed position (FIG. 3B). Then, a garbage bag 70 (e.g. a plastic bag often referred to as a liner bag, trash bag, etc., schematically represented by think line) is placed into the garbage space 34, with top opening lips of the garbage bag 70 placed over the annular bag mounts 44 and 46. Then, slack portions 74 of the garbage bag 70 are introduced from an outside of thoroughgoing openings 48 into the garbage space 34 side. Once the garbage bag 70 is positioned, the bag holder 52 is lowered into its closed, bag holding position (FIGS. 3A, 4C-4E, 5A), whereby top portions of the garbage bag 70 become clamped and arrested (i.e. prevented from sliding) between the bag mounts 44; 46 and the lip 60 of bag clamping arrangement.

Figure 4B:
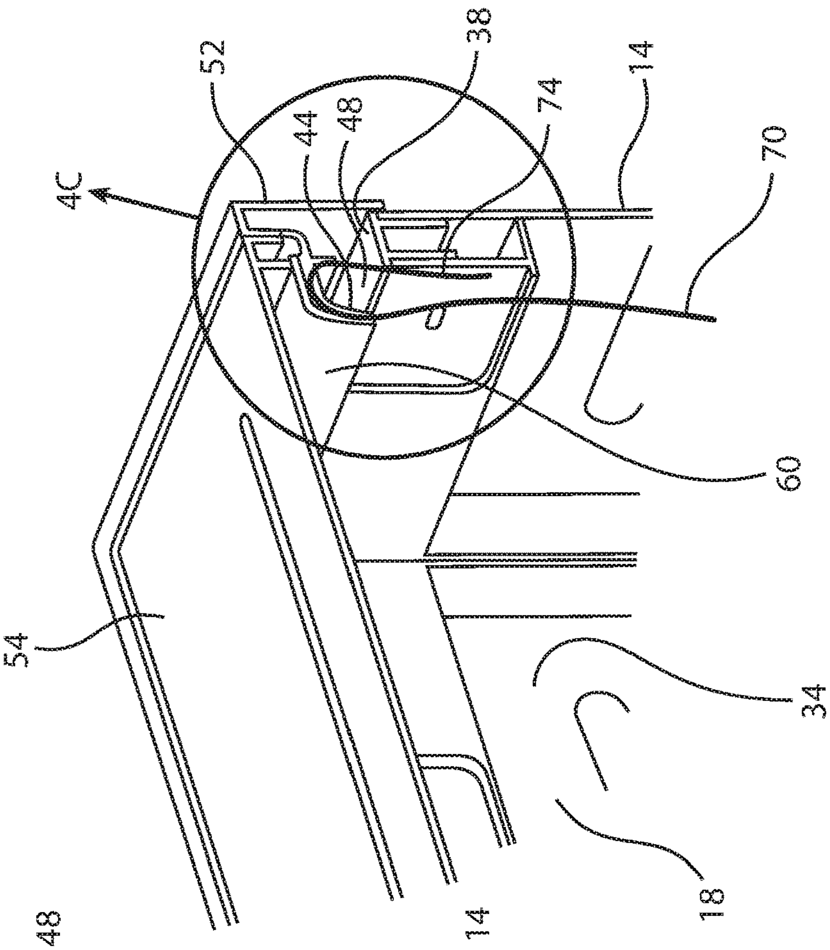
FIG. 4B is an enlargement of the portion marked 4B in FIG. 4A.
Figure 4A:
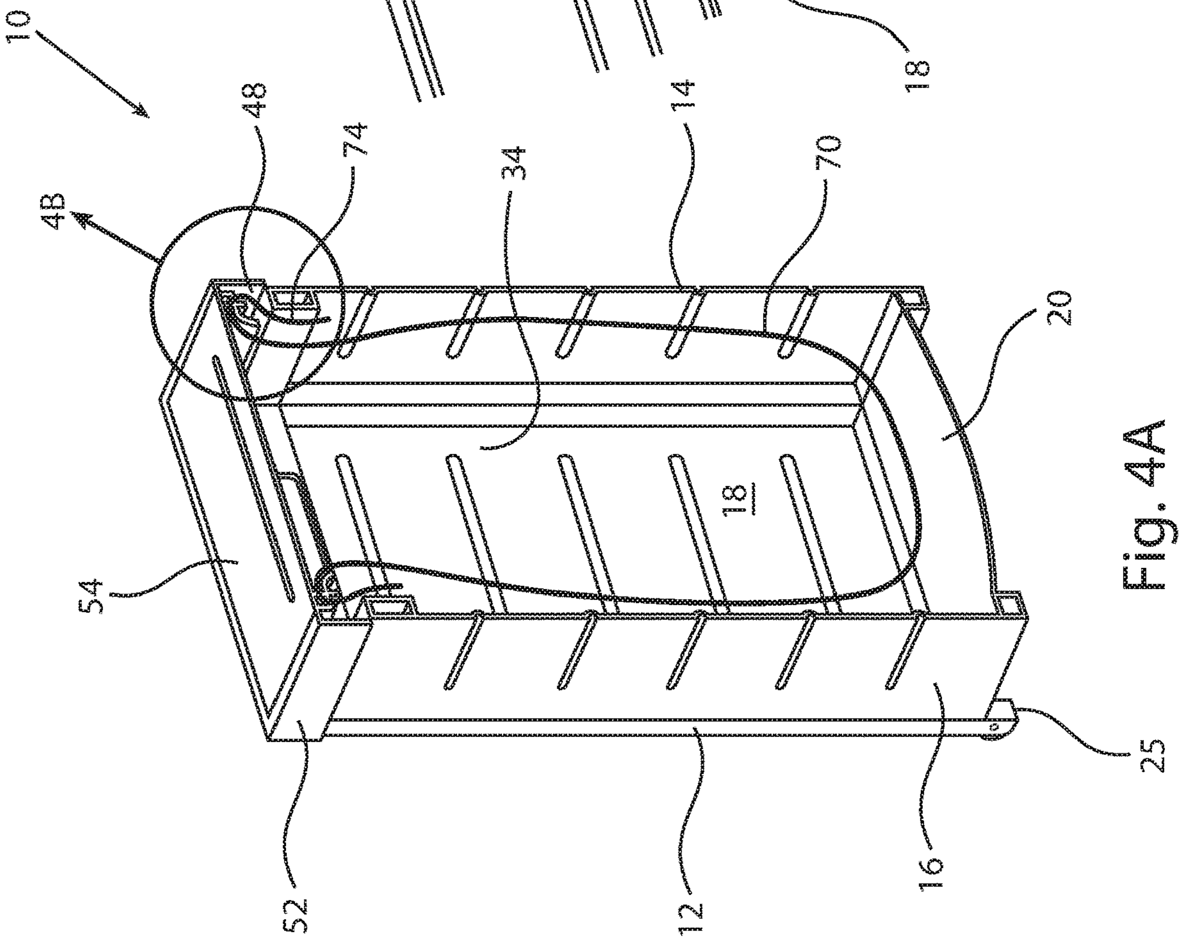
FIG. 4A is a vertical section along line 4A-4A in FIG. 1.
Figure 4C:
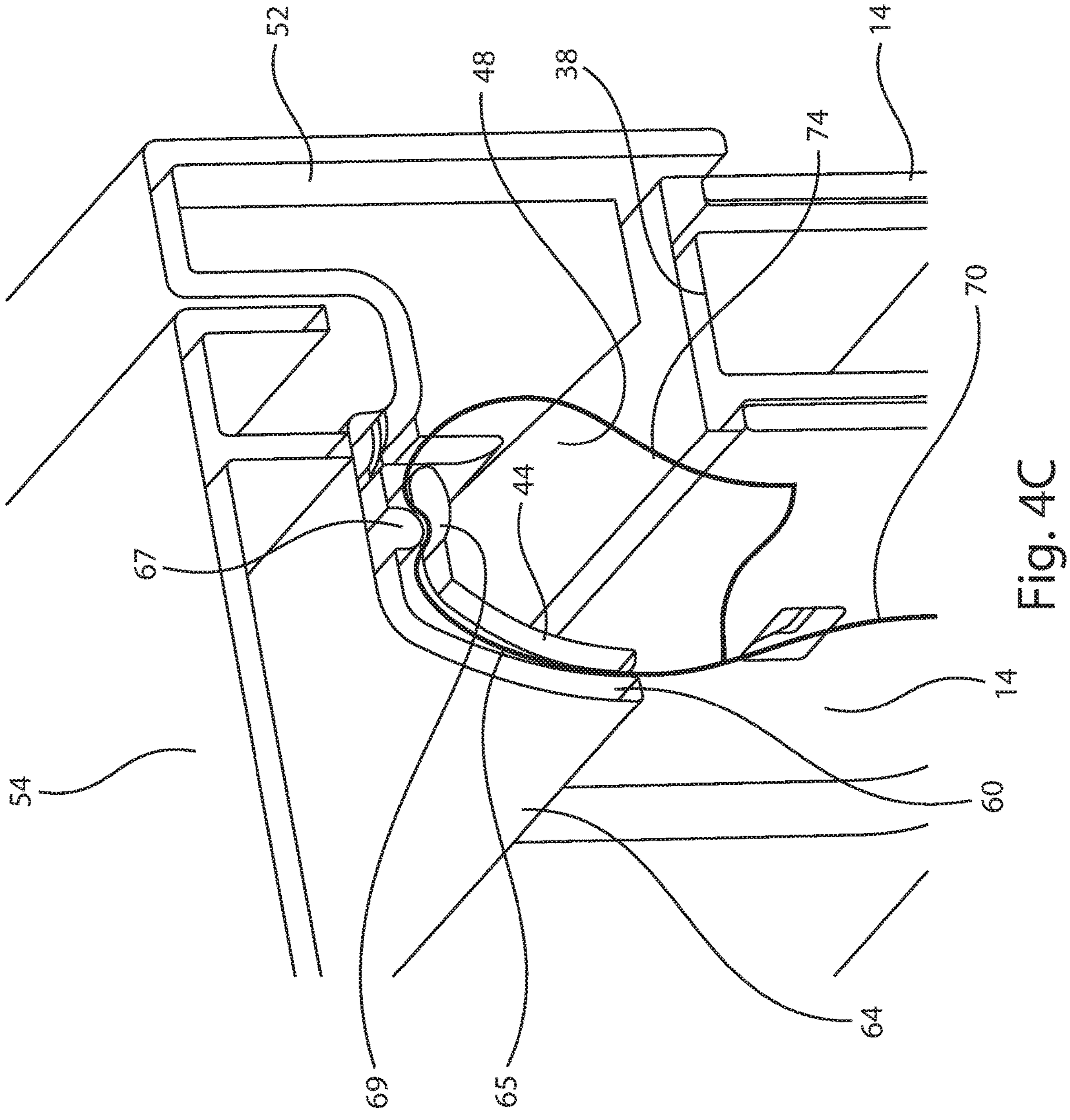
FIG. 4C is an enlargement of the portion marked 4C in FIG. 4B.
Figure 4E:
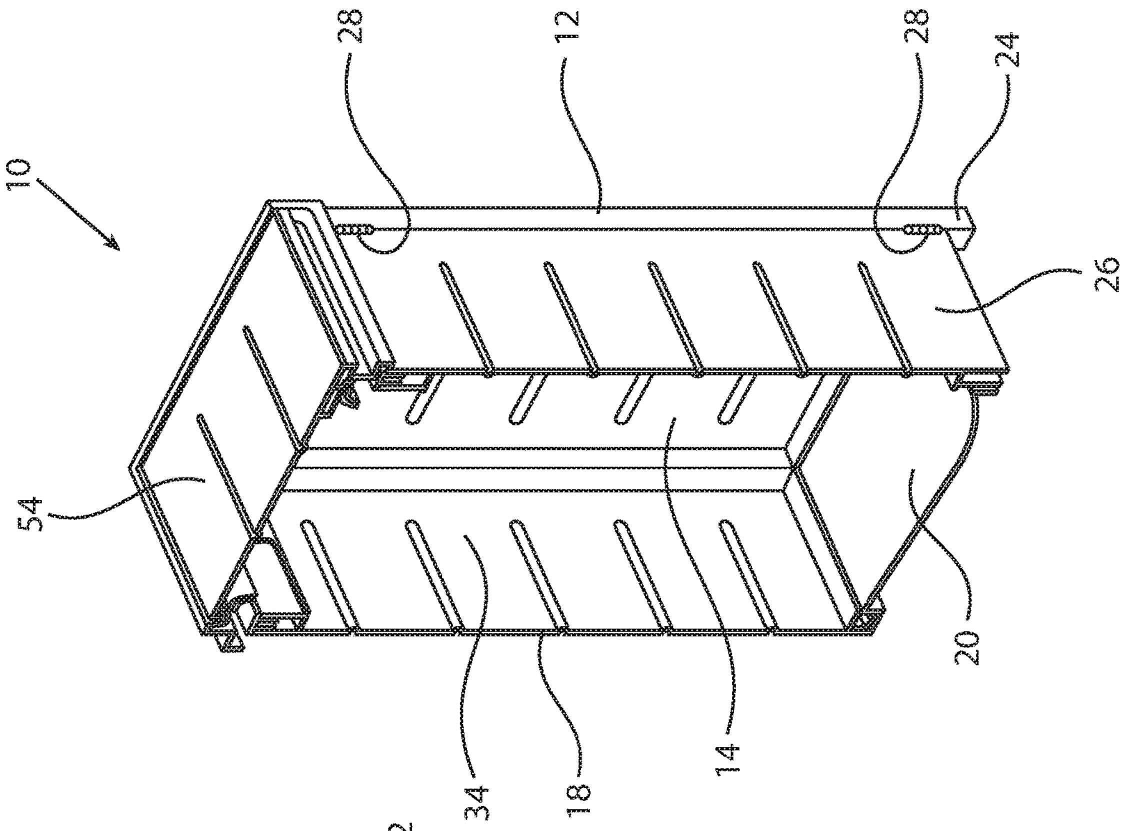
FIG. 4E is a vertical section along line 4D-4D in FIG. 1.
Figure 4D:
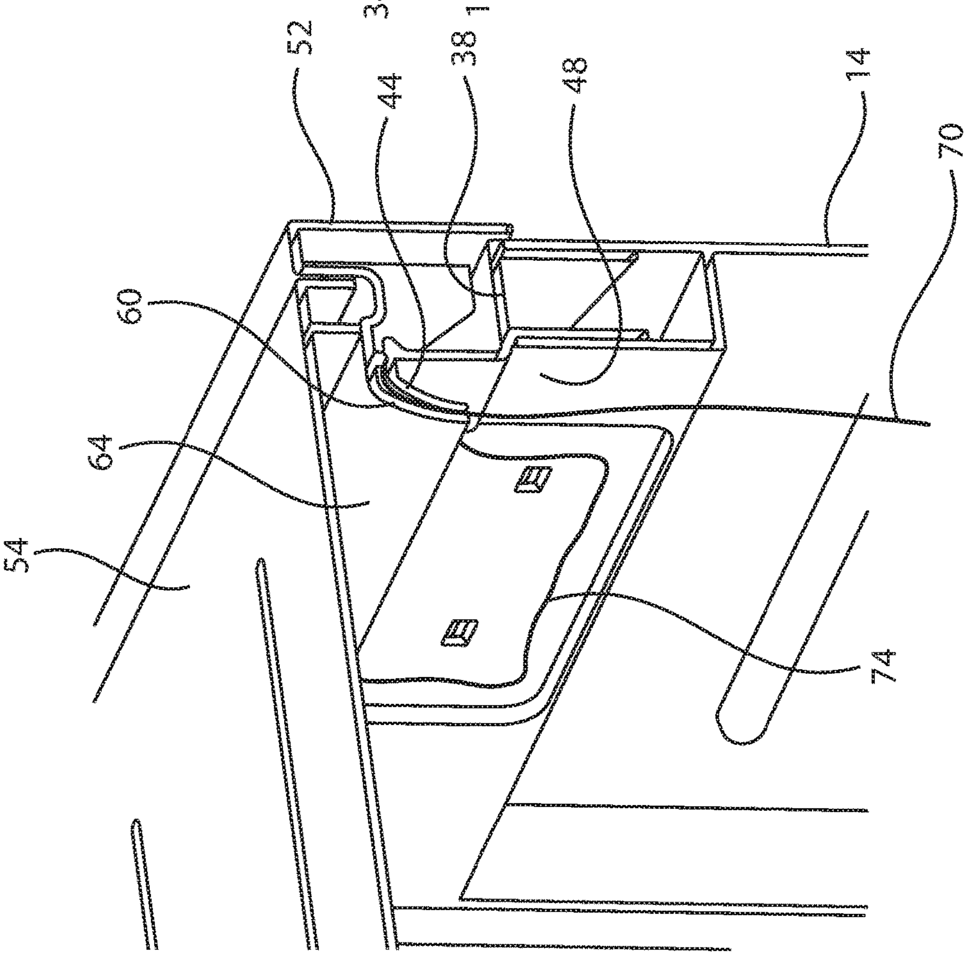
FIG. 4D is an enlarged local section taken along line 4D-4D in FIG. 1.
Figure 5B:
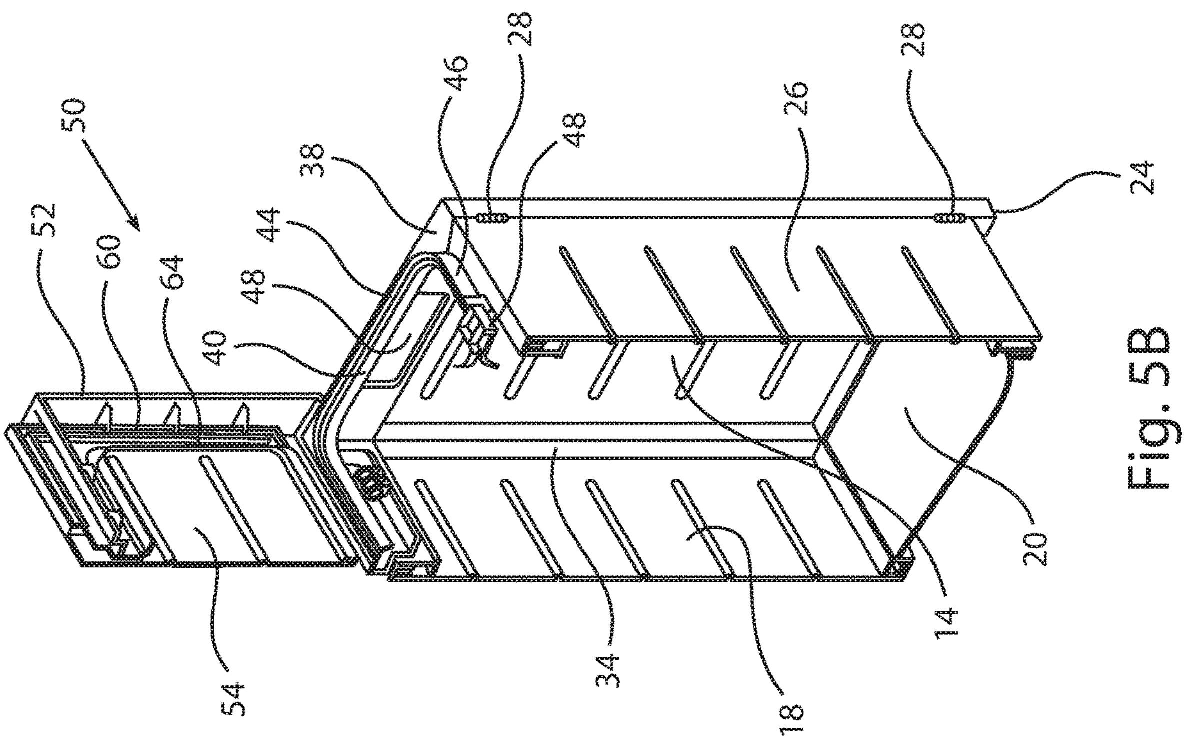
FIG. 5B is a vertical section of the trash bin of FIG. 1, with the lid assembly at an open position.
Figure 5A:
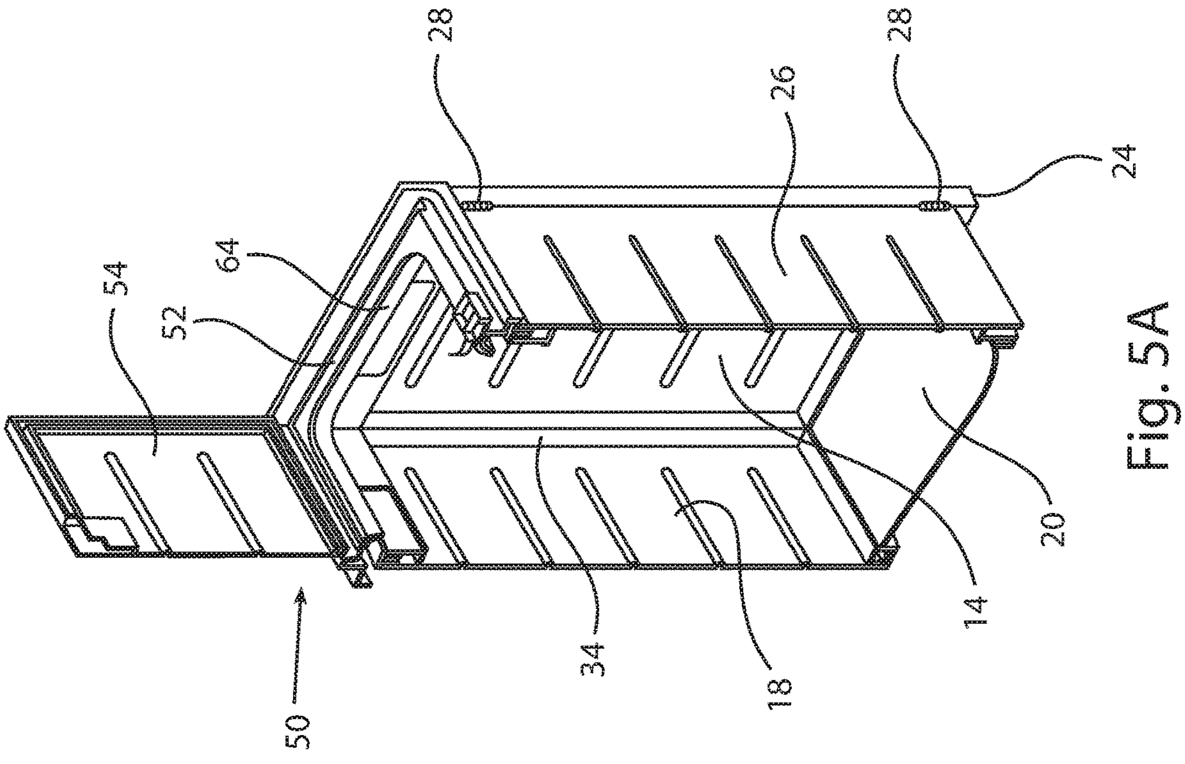
FIG. 5A is a vertical section of the trash bin, with the trash disposal lid at an open position.
Figure 5D:
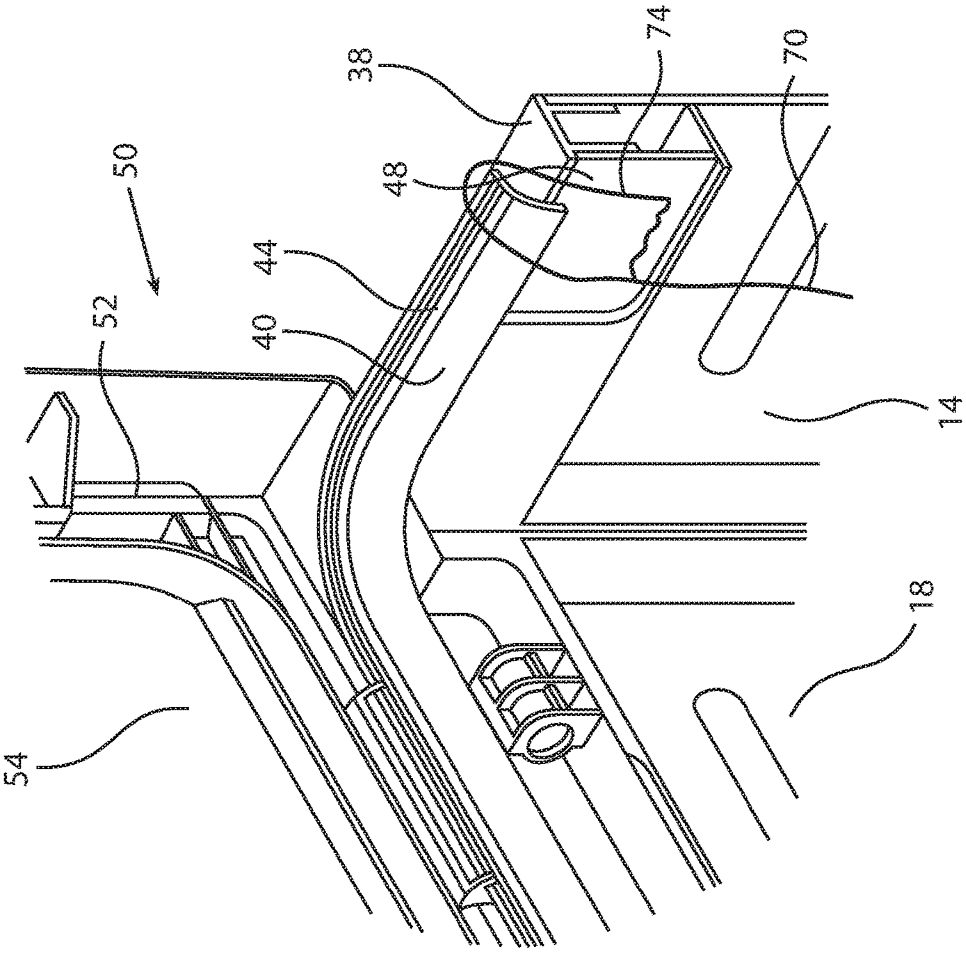
FIG. 5D is an enlargement of the portion marked 5D in FIG. 5C.
Figure 5C:
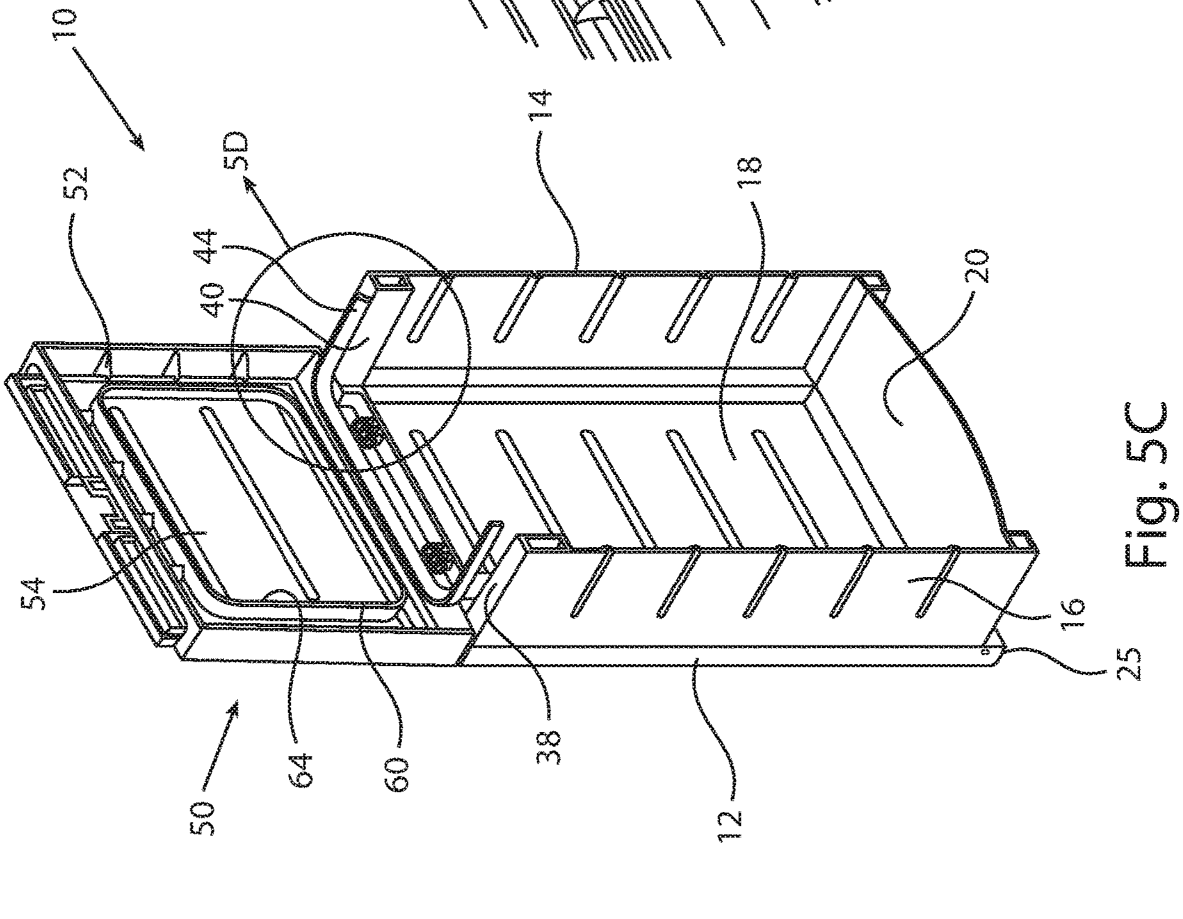
FIG. 5C is a traversing vertical section of the trash bin of FIG. 5B.

It is noted that a friction path 65 extends between the bag mounts 44; 46 and portions of the bag clamping arrangement (lip 60), so as to grip a garbage bag disposed within said path and prevent spontaneous sliding displacement thereof. The friction enhancing path can be configured with a friction enhancing arrangement for increasing friction forces of the garbage bag within said friction path. Such friction enhancing arrangement can be protuberances, ridges, humps, a labyrinth-like path, friction enhancing materials (e.g. rubber) etc., (in the present example friction enhancing labyrinth ridge 67 and grove 69; FIG. 4C).

Once the garbage bag 70 is positioned as described above, garbage can be disposed of by opening the lid 54 (FIG. 3A) (without displacing the bag holder 52). It is appreciated that at the assembled position the garbage bag 70 can rest over the inside surface of the base wall 20, or it can suspend from the bag clamping arrangement without reaching the base 20.

Removing the bag does not require lifting the bag (which can be a serious issue for disabled individuals, children, etc., and even for adults, when the contents of the garbage bag is heavy and bulky, and even more so when moisture causes the outside surface of a garbage bag to attach to inside wall surface of a garbage can. According to the disclosure, all that is required in order to remove a full garbage can is displacing the lid assembly (namely bag holder 52 and lid 54) into the open position, then opening the front door 26, and simply removing the garbage bag 70 from the garbage space 34 through the widely open front door, without out having to lift the garbage bag 70.

Further attention is now directed to FIGS. 6 to 13 of the drawings, illustrating a trash bin according to another embodiment of the present disclosure.

Figure 6B:
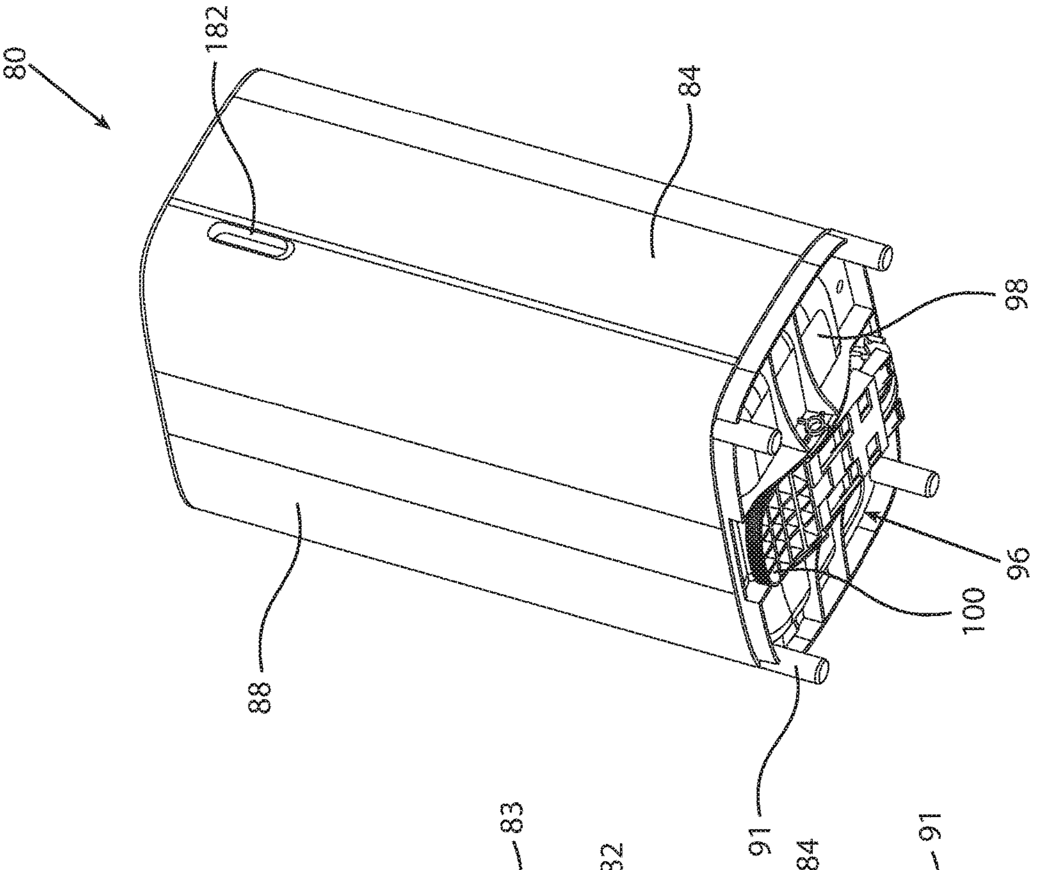
FIG. 6B is a front, bottom perspective view of the trash bin of FIG. 6A.
Figure 6A:
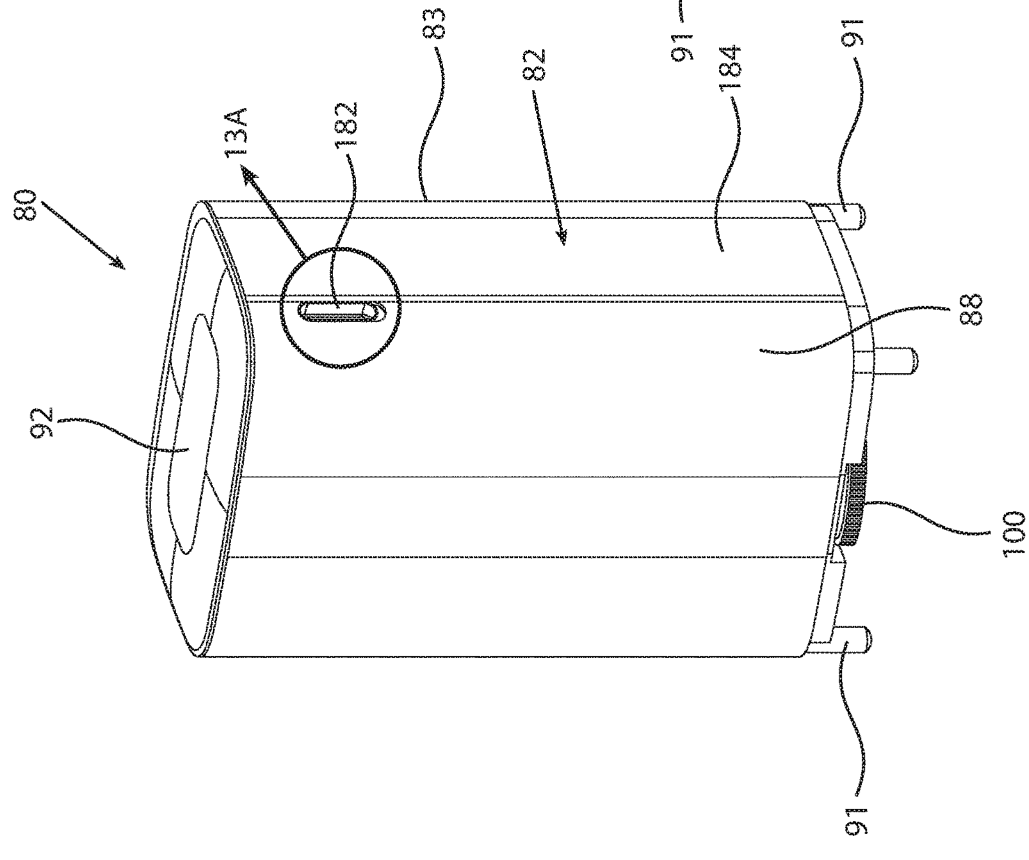
FIG. 6A is a front, top perspective view of a trash bin according to another embodiment of the disclosure, being a pedal type bin, the bin illustrated with a pedal thereof at a stow position.

A trash bin 80 is illustrated in FIG. 6A, having a rectangle appearance with rounded corners, said bin comprising a body 82 with side walls (namely back wall 83 and two side walls 84), a front door 88 pivotally articulated along a side edge thereof to a side edge of a left side wall (FIG. 12), and a top lid 92 hinged at its rear to a top edge of the back wall and being pivotally displaceable between a fully closed position (e.g. FIGS. 6A and 7A), an open position (e.g. FIG. 10A) and a fully open position (e.g. FIG. 11A), to be discussed hereinafter. As can be seen e.g., in FIGS. 8A, 8B, 10A, the side walls 84 and front door 88 have complimentary top edges 95 and 97, respectively, defining together a top opening into a garbage space 99 of the bin 80.

Figure 7A:
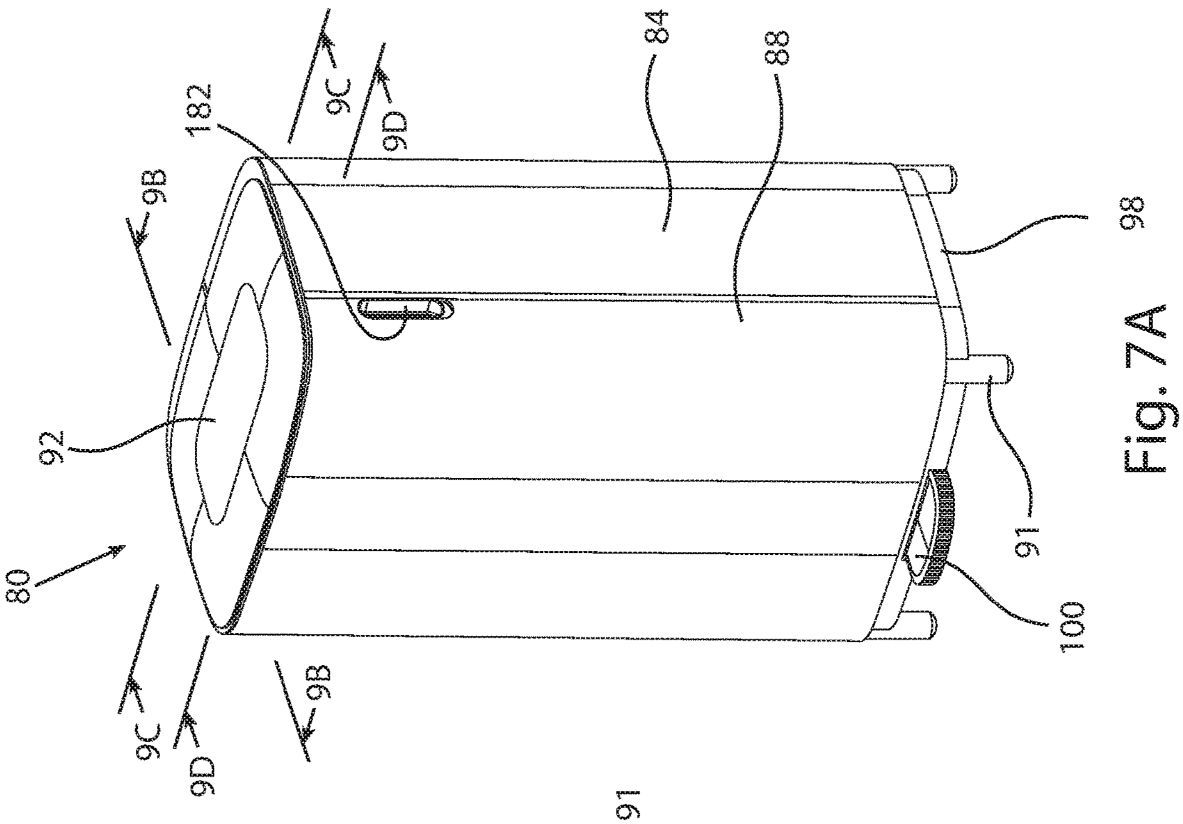
FIG. 7A is a front, top perspective view of the trash bin of FIG. 6A, at its operative position.
Figure 6C:
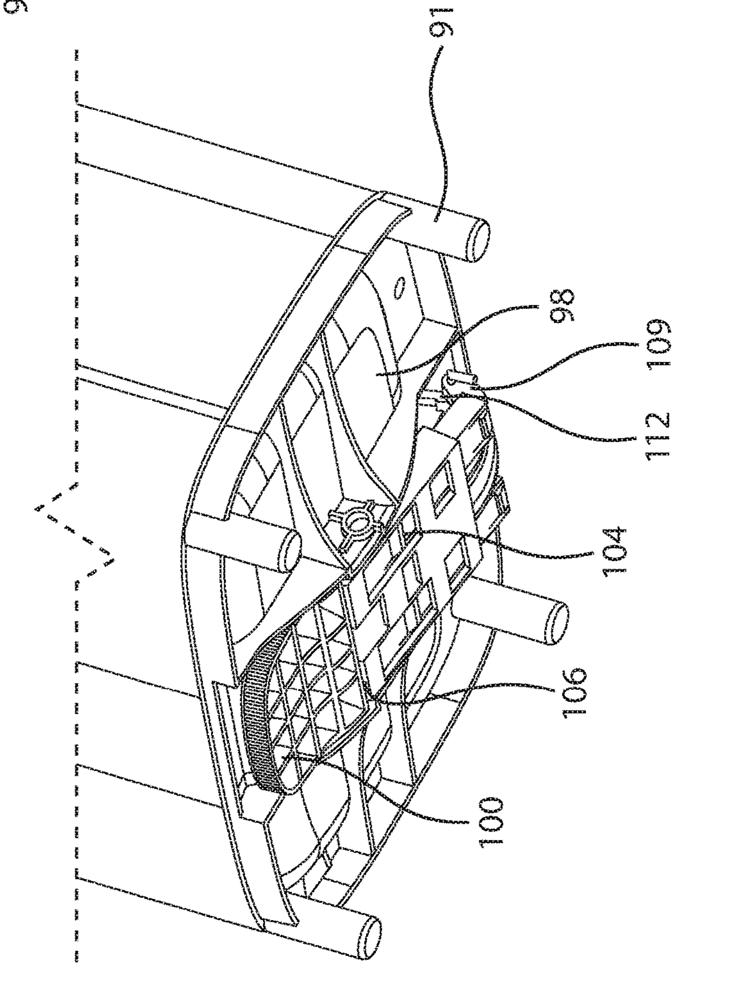
FIG. 6C is an enlarged view of the base portion of the bin of FIG. 6B.
Figure 8A:
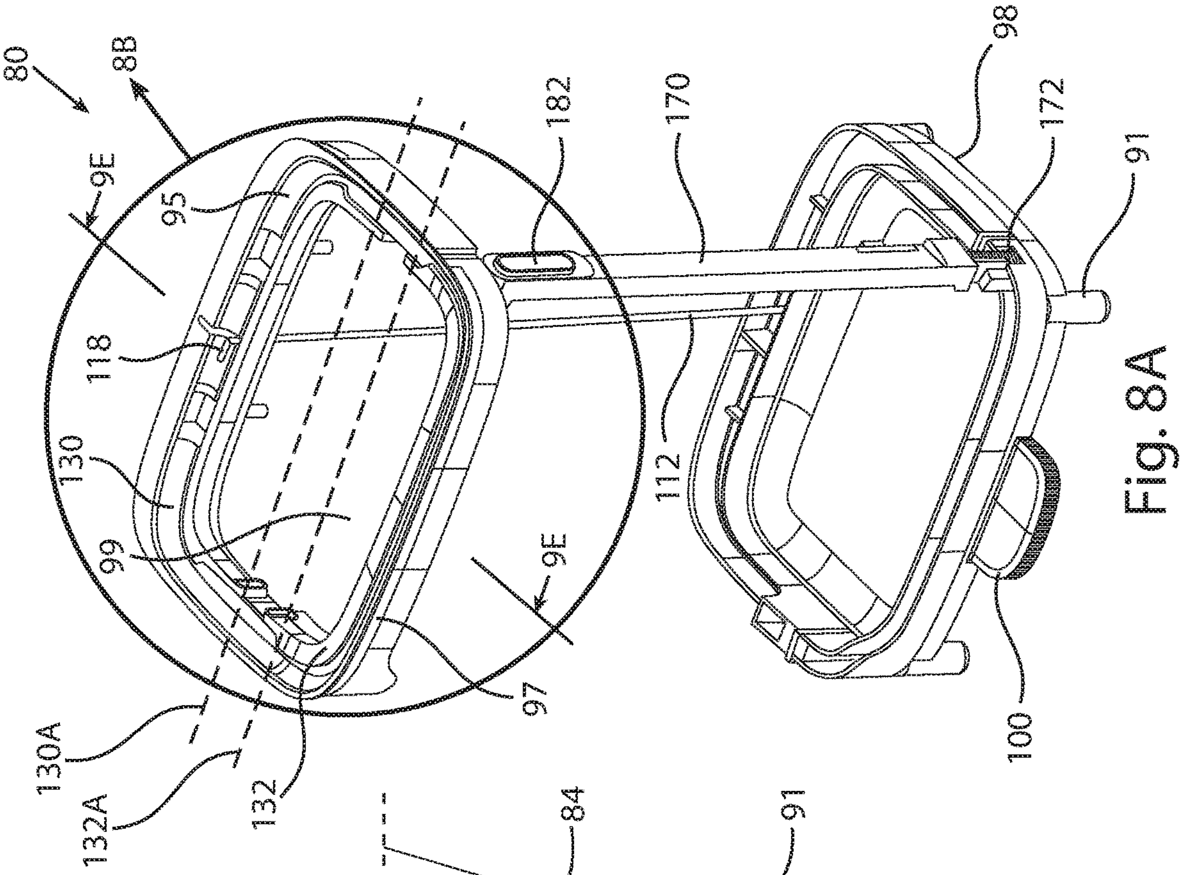
FIG. 8A illustrates the bin of FIG. 7A, with side walls, front door and lid removed, for visualizing elements of the bin, with a bag holding assembly at a garbage bag holding position.
Figure 7B:
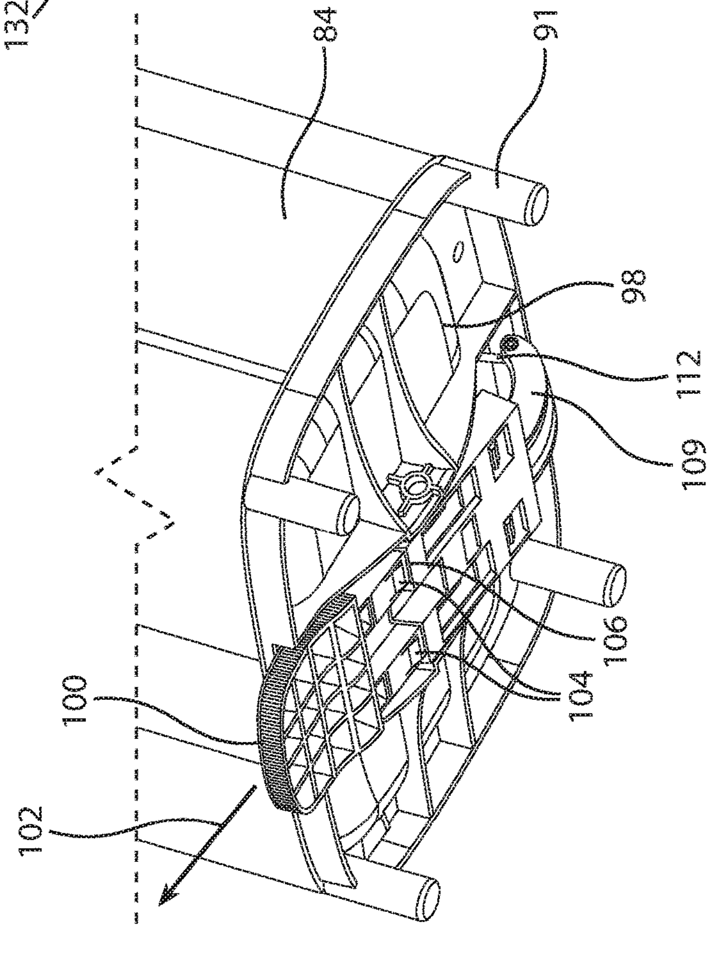
FIG. 7B is an enlarged view of the base portion of the bin of FIG. 7A.

The bin 80 is a pedal-type trash bin mounted on four legs 91, and comprising a foot-operated pedal mechanism 96 positioned at a front portion of the base 98 of the bin and comprising a foot pedal 100 manipulable between a shipping/stowed position (FIGS. 6A to 6C) at which it does not project from a front face (namely front door 88) of the bin, thus restricting the footprint of the bin, and an operative position (e.g. FIGS. 7A and 7B). The pedal 100 is manipulated into its operative position by pulling it out in direction of arrow 102 (FIG. 7B) until it reaches a fully retracted operative position, wherein it is arrested by snap latches 104 engaged within apertures 106. At the operative position the pedal 100 is elevated from a bottom end of the legs 91, namely from the ground, such that it can be pivotally depressed to open the lid 92 by a link mechanism comprising an arc arm 109 articulated with activating rod 112 (e.g. FIG. 9E).

Figure 9A:
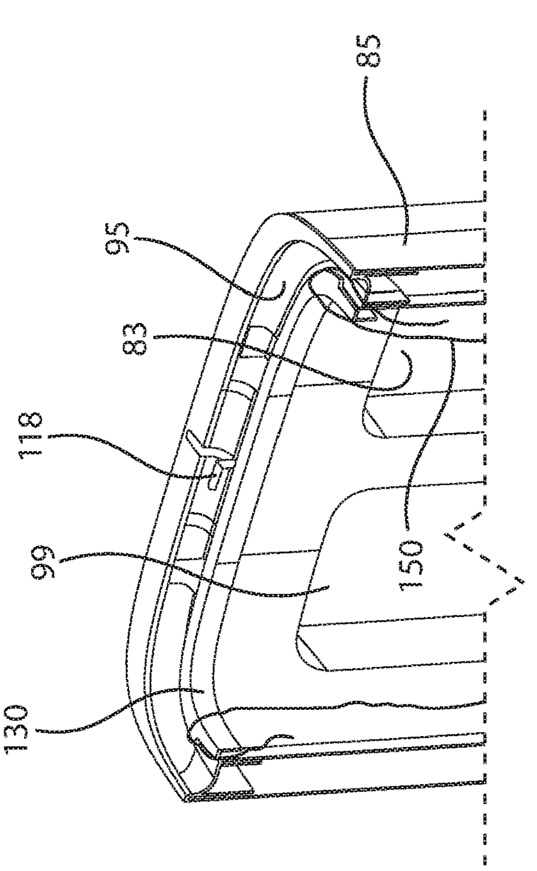
FIG. 9A is a section along line 9A-9A in FIG. 8B.
Figure 9B:
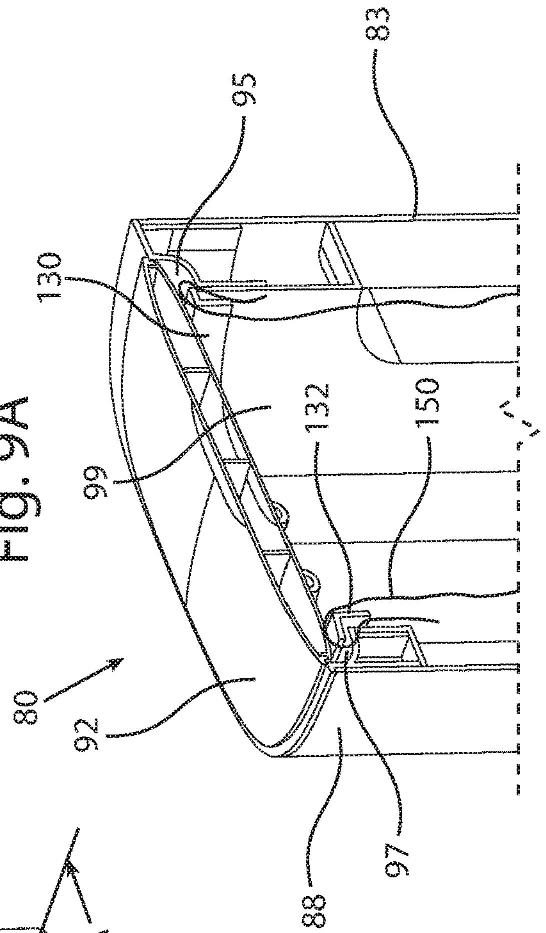
FIG. 9B is a section along line 9B-9B in FIG. 7A.
Figure 8B:
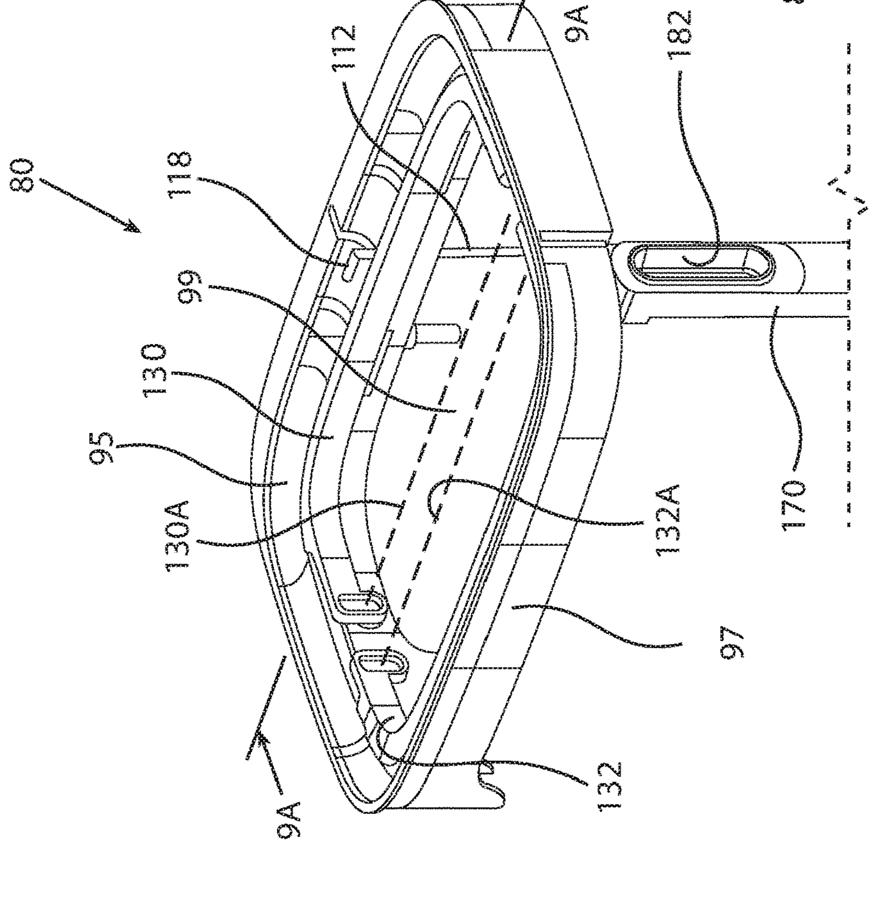
FIG. 8B is an enlargement of the portion marked 8B in FIG. 8A.

Top edge 95 of side walls 84 and top edge 97 of front door 88 coextend in a complimentary fashion, having a shoulder-rim defining together the top opening, wherein at its closed position lid 92 is at least partially nested within the top rim (FIG. 9B). Lid 92 is pivotally articulated to a top portion of the back wall by a pair of hinges 114. Activating rod 112 of the pedal mechanism 96 extends through the back wall 83, terminating at a hook-end 118 (FIG. 11C) projecting from the top edge 95 of the back wall 83. The hook-end 118 is detachably articulated within a receiving aperture 122 at a bottom portion of lid 92, said aperture comprising an arc gliding surface 124 and an arresting recess 126.

Figure 10A:
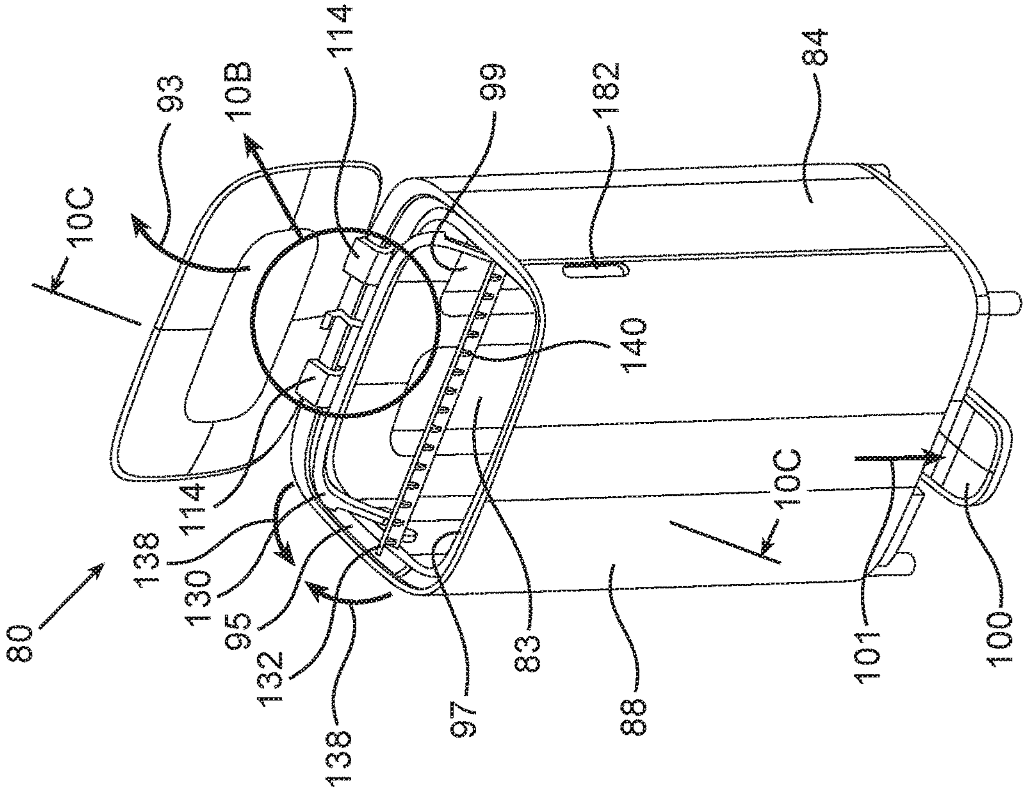
FIG. 10A illustrates the bin of FIG. 7A with the lid at an open position and the bag holding assembly disengaged.
Figure 9E:
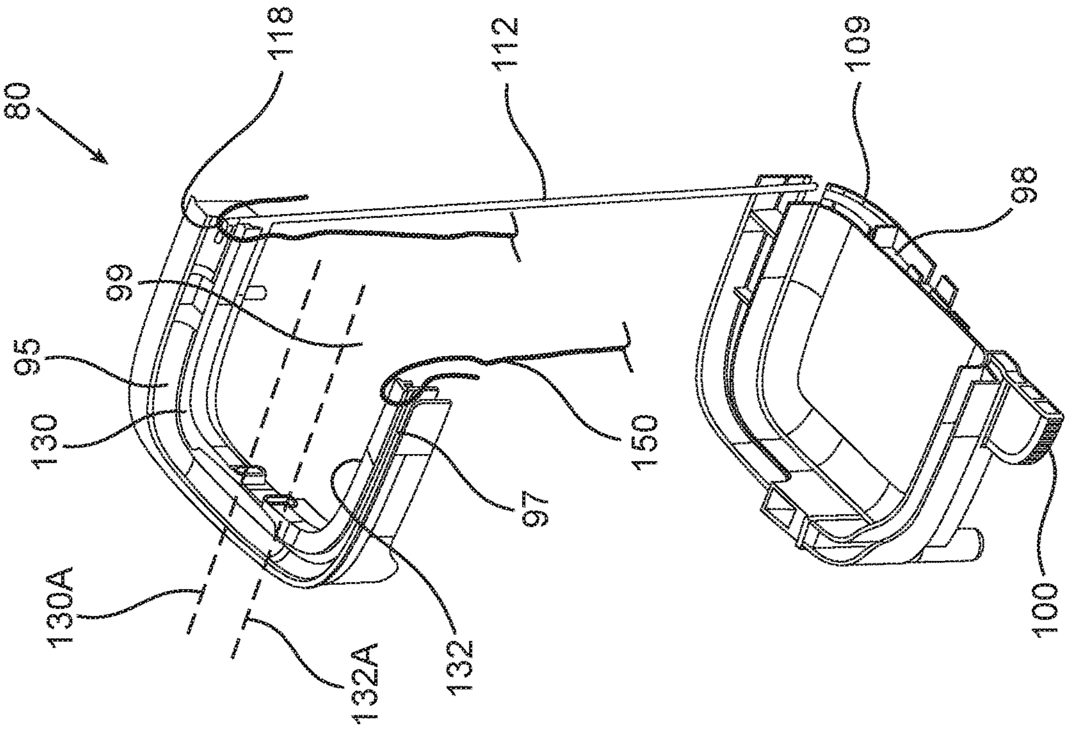
FIG. 9E is a section along line 9E-9E in FIG. 8A.
Figure 10B:
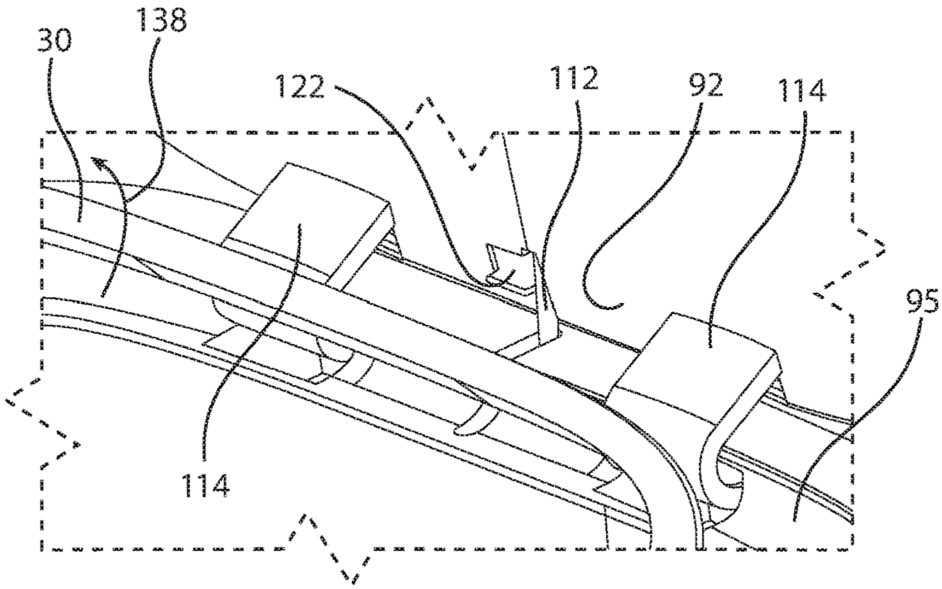
FIG. 10B is an enlargement of the portion marked 10B in FIG. 10A.
Figure 10C:
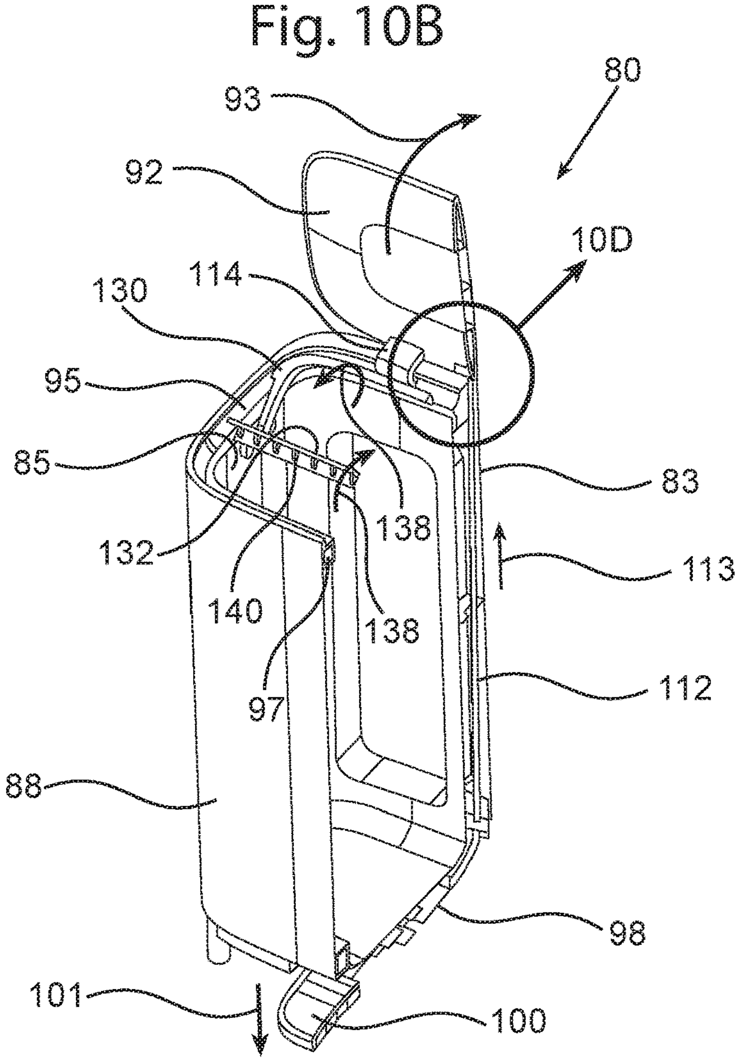
FIG. 10C is a section along line 10C-10C in FIG. 10A.
Figure 11A:
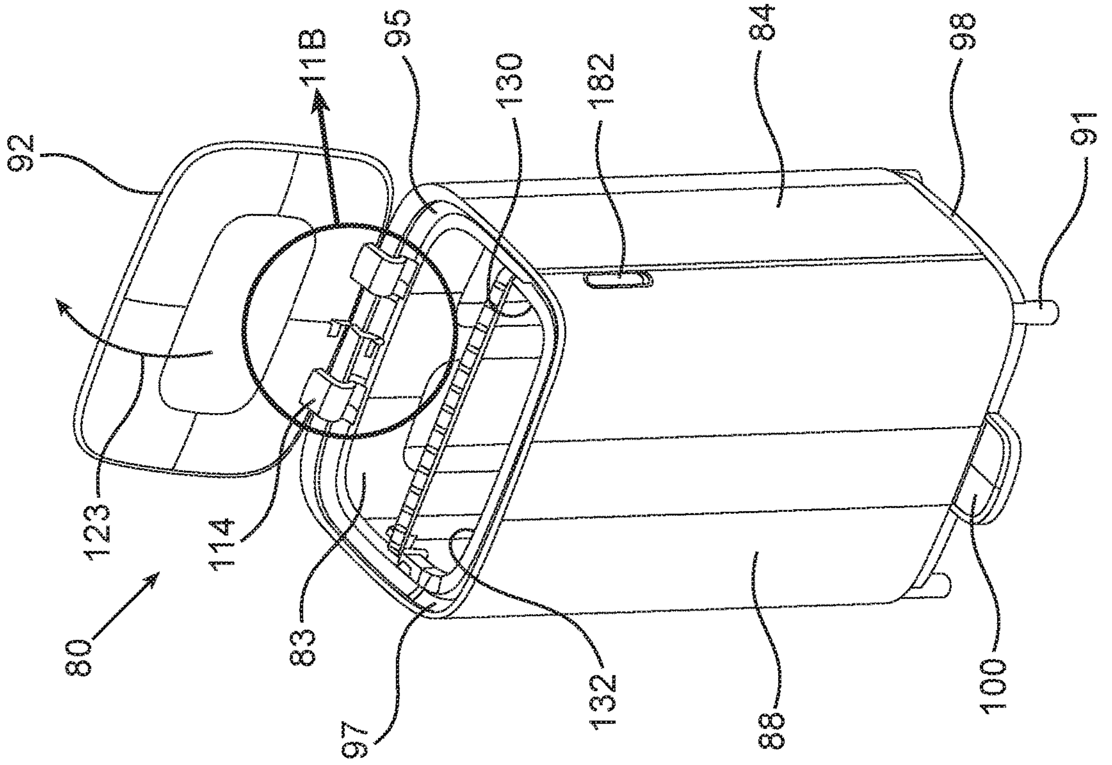
FIG. 11A illustrates the bin with the lid at a fully open position and the bag holding assembly partially disengaged.
Figure 10D:
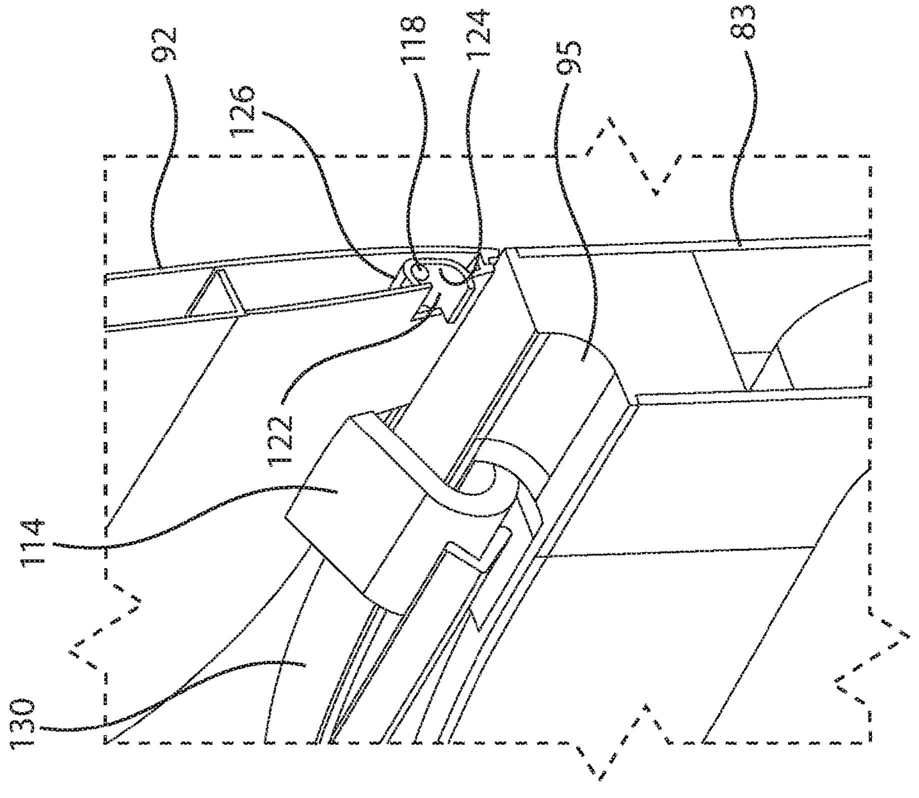
FIG. 10D is an enlargement of the portion marked 10D in FIG. 10C.
Figure 11B:
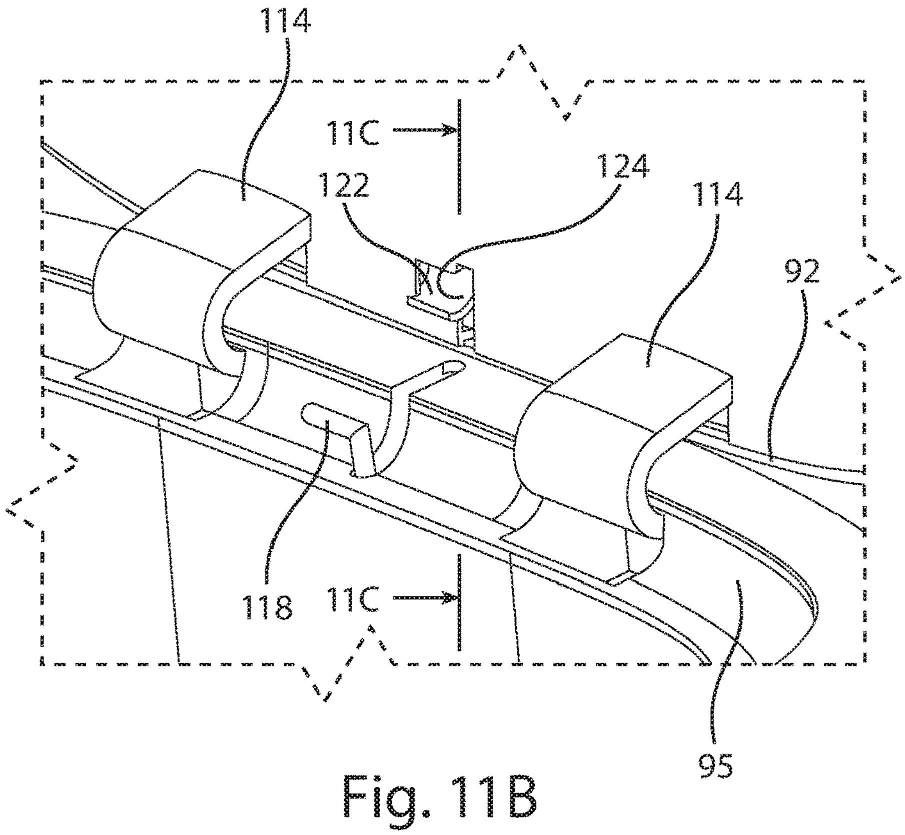
FIG. 11B is an enlargement of the portion marked 11B in FIG. 11A.
Figure 11C:
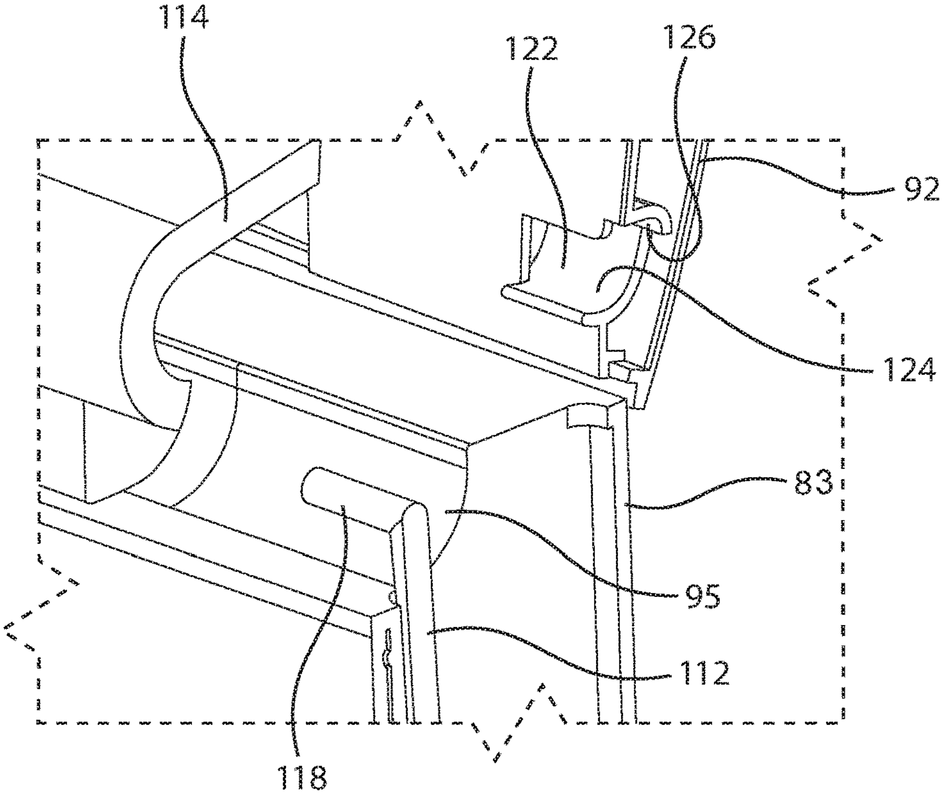
FIG. 11C is a section along line 11C-11C in FIG. 11B.
Figure 12:
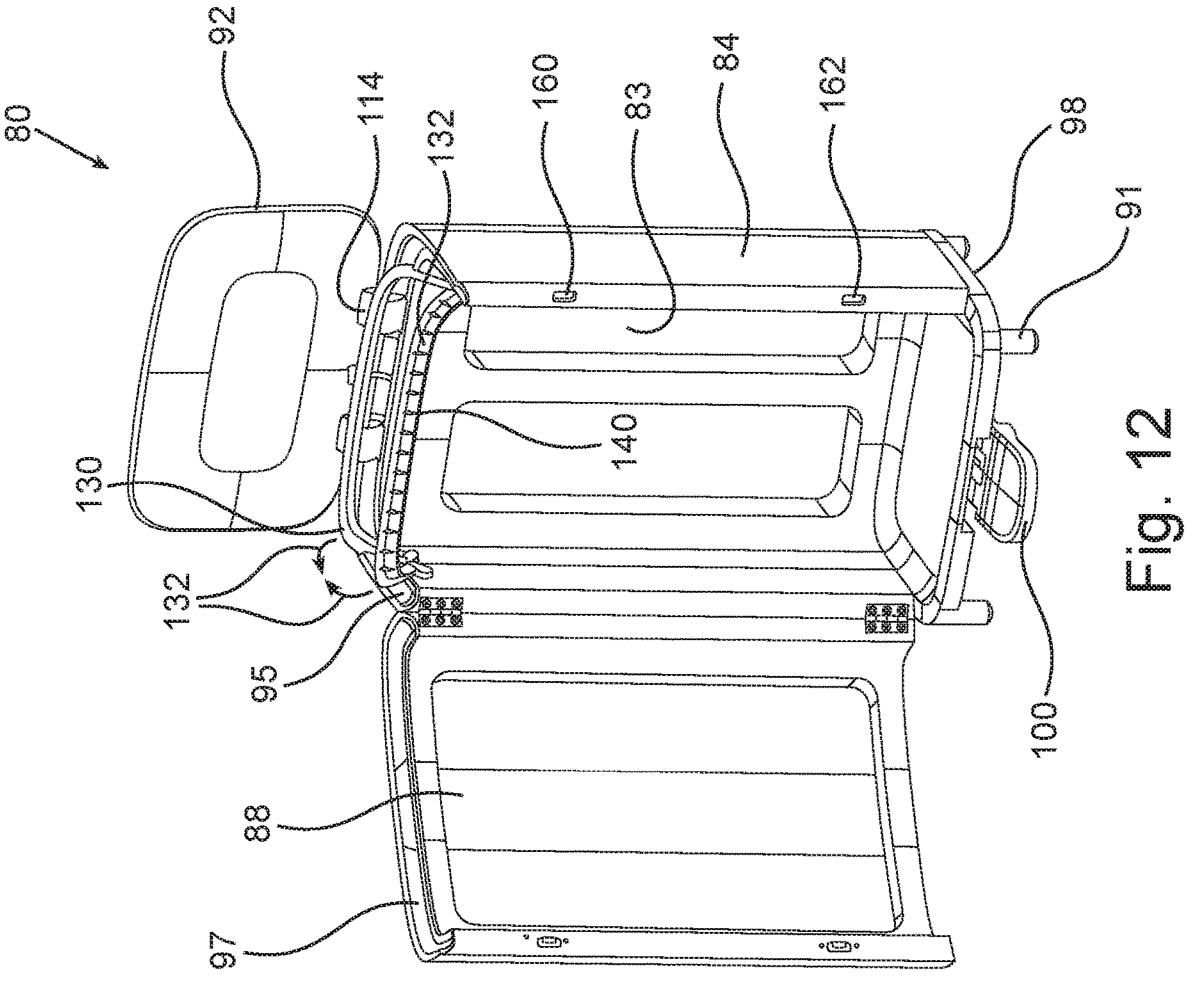
FIG. 12 illustrates the trash bin with the front door open and the bag holding assembly at a disengaged position.

The arrangement is such that the hook-end 118 is normally engaged within the arresting recess 126, whereby pressing on the pedal 100 (arrow 101; FIGS. 10A an 10C) results in axial displacement of activating rod 112 within the back wall 83, in an upward direction (arrow 113) entailed by pivotal displacement of the lid 92 (in direction of arrow 93) into its open position, facilitating access to the garbage space 99 of the bin 80 and to a bag holding assembly as will be discussed below. As long as the pedal 100 is depressed, the lid 92 remains open. However, upon releasing pressure from the pedal, the lid will pivotally displace back into its closed position, with gliding surface 124 slidingly displacing over hook-end 118. When it is required to retain the lid 92 at an open position, e.g. for loading/releasing a garbage bag (as will be discussed in detail herein below) the lid can be manually displaced into a fully open position by further tilting it in direction of arrow 123 (FIG. 11A) beyond 90° so that the lid rests inclined supported by hinges 114. Returning the lid into its closed position takes place simply by manually pivoting it back, in direction opposite to arrow 123, allowing the lid 92 to displace into its closed position nested over the top rim.

The bin 80 further comprises a garbage bag holding arrangement configured at the top portion 95 (of the back wall 83 and side walls 84) and at the top portion 97 of the front door 88. The garbage bag holding arrangement comprises a rear bag holder 130 and a door bag holder 132, both of which being pivotally articulated at a top portion of opposite side walls 84. The bars 130 and 132 are swingable about parallelly extending axes 130A and 132A, respectively, between a garbage-bag clamping position (FIGS. 8 and 9) wherein the rear bag-holder bar 130 bears over top edge 95 of the respective side walls 84 and rear wall 83, and the door bag-holder bar 132 bears over a top portion 97 of the front door 88, and a bag releasing/mounting position wherein the rear bag-holder 130 and the door bag-holder 132 are pivotally displaced towards one another, in direction of arrows 138 (FIGS. 10A, 10C, 11A, 12) to disengage from the respective top portion.

Figures 9C, 9D:
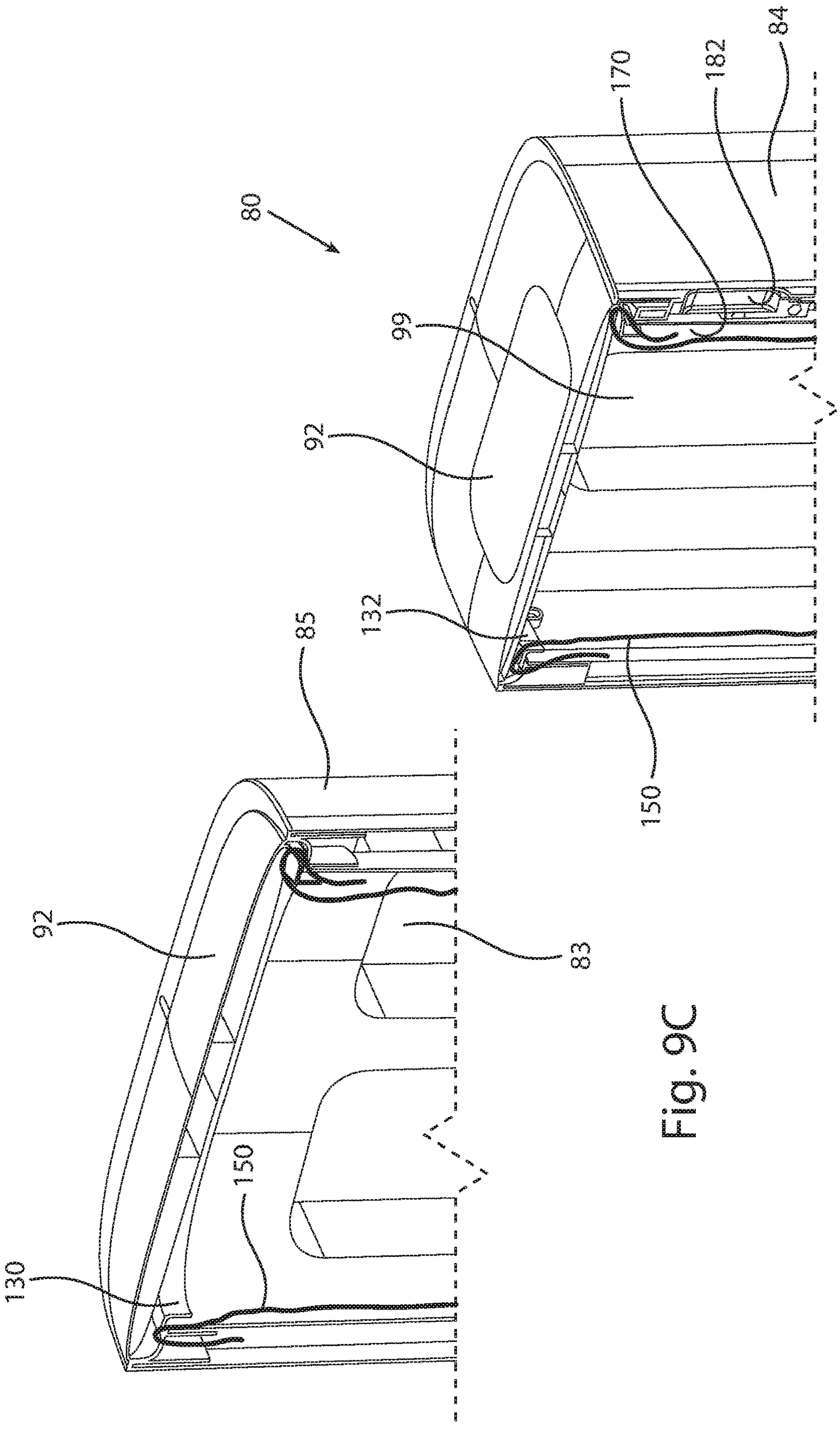
FIG. 9C is a section along line 9C-9C in FIG. 7A.
FIG. 9D is a section along line 9D-9D in FIG. 7A.

At the garbage-bag clamping position, the rear bag-holder 130 and the door bag-holder 132 are configured for bearing over the respective shoulder-rim (defined by coextending top edges 95 and 97), defining a friction path between said arms and said shoulder-rim, for clamping—arresting a top opening portion of a garbage bag, and wherein said bars 130 and 132 are each configured with friction enhancing projections 140 (FIG. 10A) for increasing friction and grab of the garbage bag within said friction path. Schematically illustrated by thick solid line 150, is a top portion of a garbage bag, received at the friction path and clamped by the rear bag-holder 130 and the door bag-holder 132, preventing disengagement of the garbage bag also at the event of said bag being full. However, once the bars 130 and 132 are pivotally displaced into the bag releasing position, the bag can be easily removed. It is appreciated that when the lid 92 is at its closed position, it bears over the rear bag-holder 130 and the door bag-holder 132, thus increasing clamping forces over the garbage bag, preventing disengagement/detaching thereof (FIG. 9B-9D).

Thus, applying a garbage bag 150 within the bin 80 takes place by displacing lid 92 into its open/fully open position, tilting the rear bag-holder 130 and the door bag-holder 132 into their bag releasing/mounting position, and placing a garbage bag within the garbage space 99, tucking the opening of the garbage bag over and under the bars 130 and 132 and pivoting them back into the garbage-bag clamping position, and finally closing the lid 92. The garbage bag 150 will remain in place as long as the rear bag-holder 130 and the door bag-holder 132 are at their garbage-bag clamping position, regardless the position of lid 92.

The trash bin 80 is further configured with a locking arrangement for retaining the front door 88 at its closed position, also at the event of a loaded garbage bag 150, which may apply some force on the door. With further attention to FIGS. 13 and 14, the door locking arrangement comprises a top locking recess 160 and a bottom locking recess 162, positioned at a front edge of the right side-wall 84 (FIG. 12), said locking recesses having shoulders configured for arresting a locking tongue, as will be explained hereinbelow.

Figure 13A:
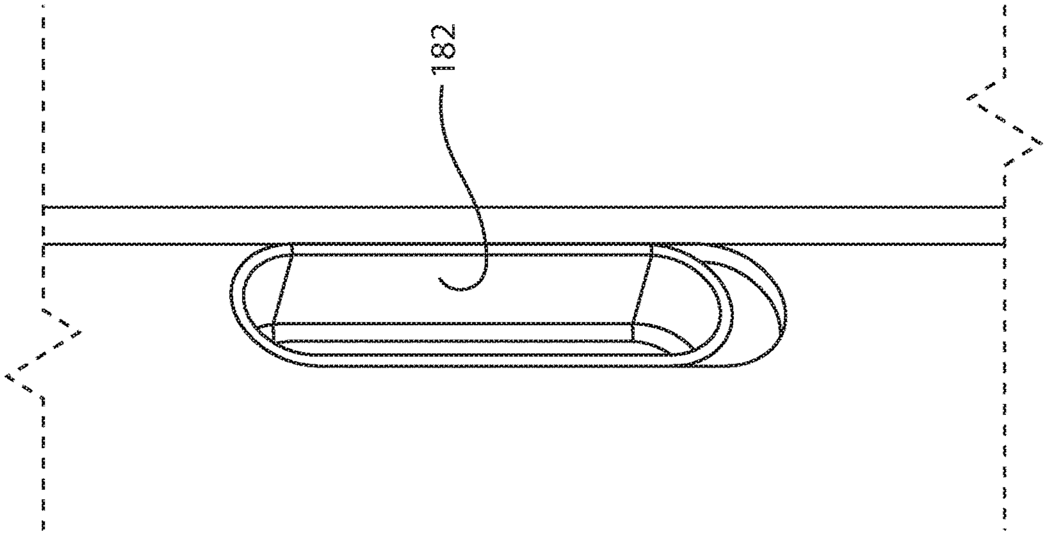
FIG. 13A is an enlarged view of the portion marked 13A in FIG. 6A, illustrating the door lock manipulator at its normally locked position.
Figure 13C:
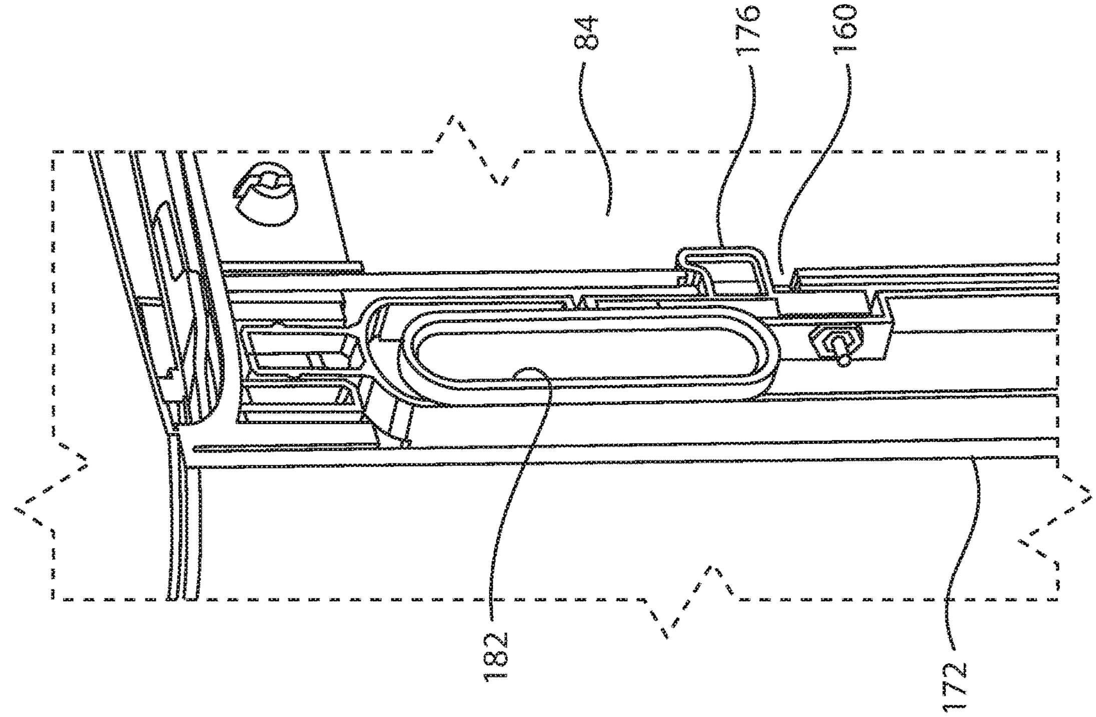
FIG. 13C an enlarged view of the portion marked 13C in FIG. 13B.
Figure 13B:
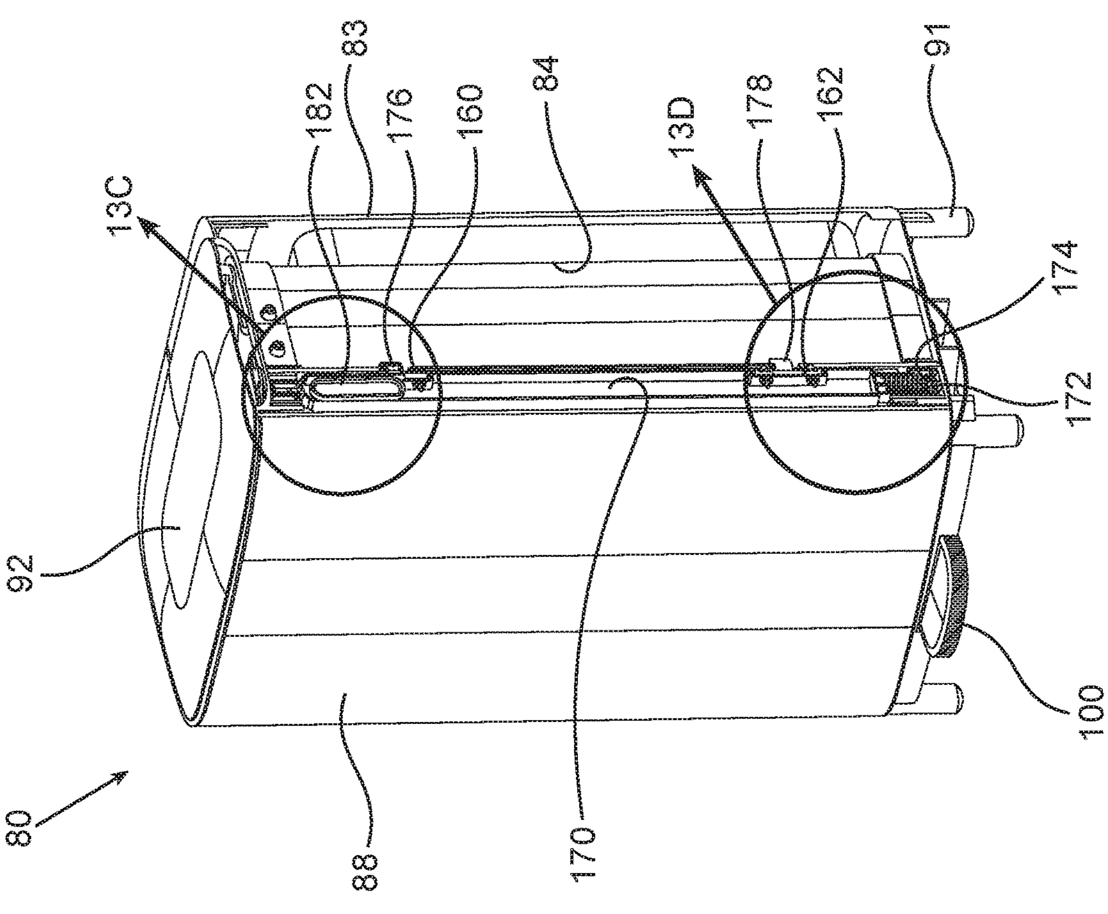
FIG. 13B is a longitudinal section along line 13C-13C in FIG. 6A, exposing the door locking mechanism at the locked position.
Figure 13D:
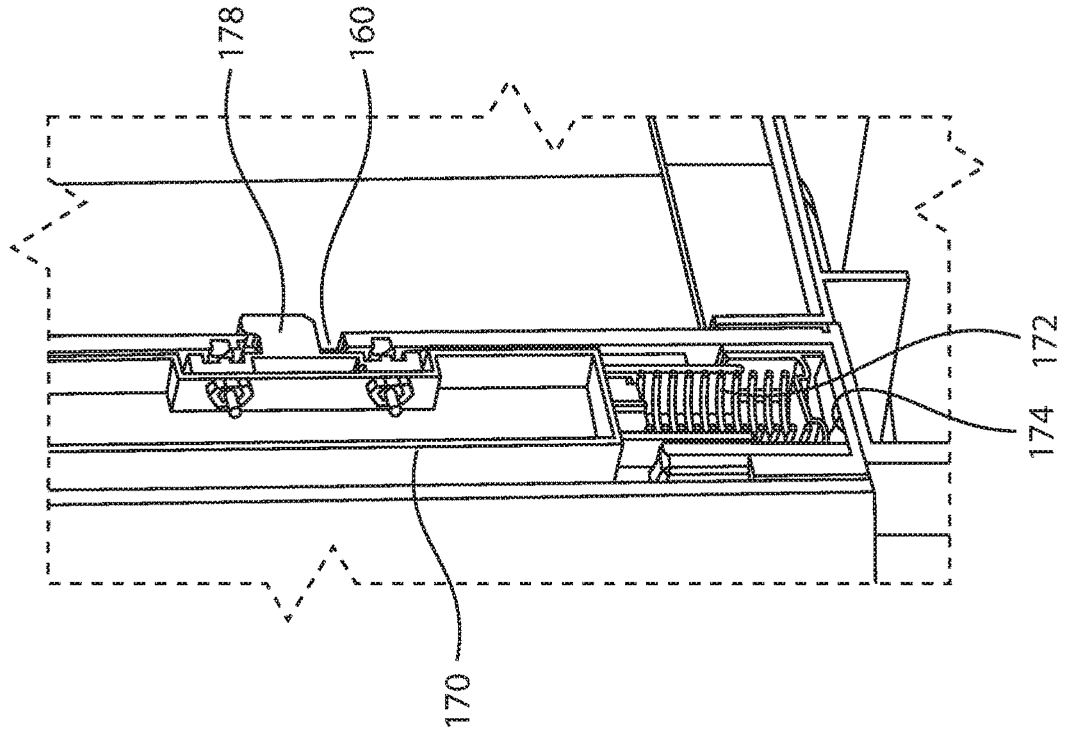
FIG. 13D an enlarged view of the portion marked 13D in FIG. 13B.
Figure 14A:
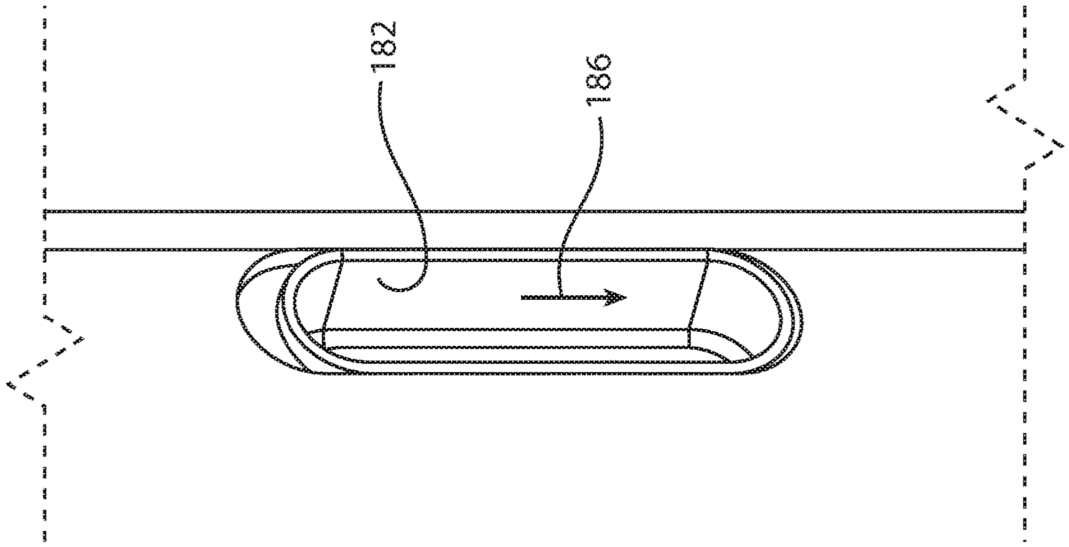
FIG. 14A illustrates the door lock manipulator at an unlocked position.
Figure 14C:
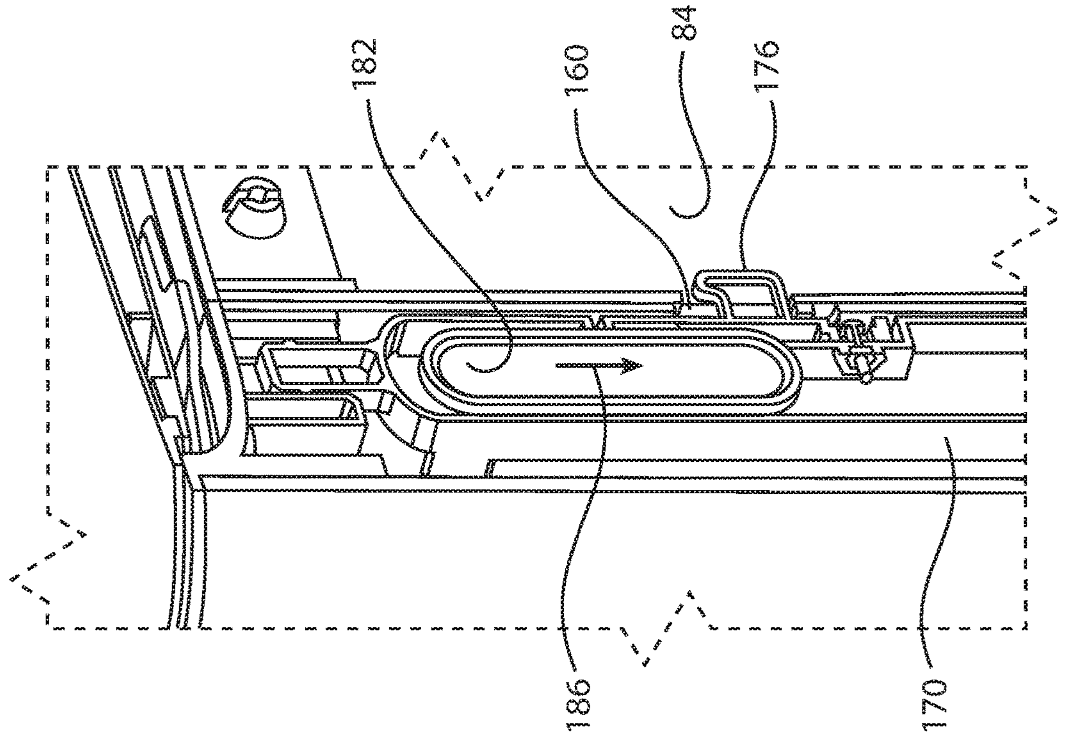
FIGS. 14B and 14C correspond with FIGS. 13C and 13D, respectively, illustrating the door locking mechanism at the unlocked position.
Figure 14B:
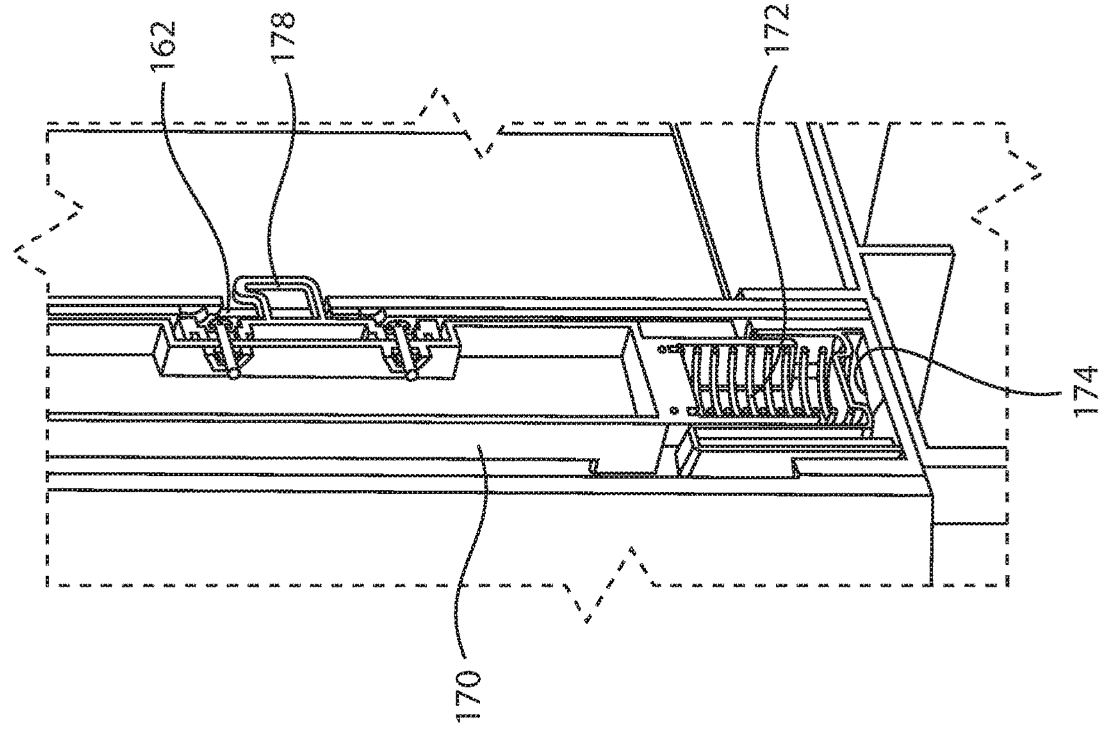

A locking slider rod 170 is slidingly received within the door 88, near a free end thereof, and is normally biased into an upward position, being a normally closed position, by a coiled spring 172 disposed between the locking slider rod 170 and a base portion 174 of the door. Locking slider rod 170 is fitted with a top locking tongue 176 and a bottom locking tongue 178, each extending opposite the top locking recess 160 and the bottom locking recess 162, respectively, wherein at a normal position said locking tongues 176 and 178 are disposed in register with the respective locking recess at a locking position (FIGS. 13B-13D). The locking slider rod 170 is further configured with a basin-like finger grip 182 fitted for sliding displacing the locking slider rod 170 between its normally locked/engaged position (e.g. FIGS. 6A, 7A, 13A-13D) and its unlocked/disengaging position, displaced downwards against the biasing spring 172, in direction of arrow 186 (FIGS. 14A to 14C). At the unlocked/disengaging position the locking tongues 176 and 178 are positioned free within the locking recesses 160 and 162, respectively, whereby the front door 88 can be opened.

At the door's open position, a garbage bag received within the garbage space 99 can be easily removed therefrom, without having to lift the garbage bag.

According to another example, not shown, the front door can be pivotally attached to the bin's body at a bottom portion thereof, wherein opening the front door is by tilting the door about a horizontal axis, exposing the bin's garbage space.

The invention claimed is:

1. A trash bin comprising:

a solid body having side walls, a top lid, a front door, and a garbage bag holding arrangement extending over a top portion of the front door and over a top portion of the side walls, wherein a garbage bag is removable through the front door;

said side walls and front door have top edges defining together a top opening into a garbage space of the bin;

said front door is displaceable between a closed position and an open position;

the top lid is articulated at a top portion of the body and pivotally displaceable between a closed position bearing over the top opening, and an open position exposing said top opening and providing access into said garbage space; and said garbage bag holding arrangement includes a rear bag-holder extending over at least a back portion of the top opening, and a door bag-holder extending over at least the door portion of the top opening;

the trash bin further comprising a lid assembly including the top lid and a bag holder articulable over the top edge of the body and being configured with a bag holder opening and a bag clamping arrangement at a bottom face of thereof, said bag holder being displaceable between a bag holding position and an open position, wherein at the bag holding position the bag clamping arrangement of the bag holder bears over at least portions of a bag mount configured at the top edge of the side walls and a front bag mount, wherein the bag holder is configured with one or more thoroughgoing openings extending from a top portion face, laterally disposed with respect to a bag mount, said openings configured for tacking therein slack of a garbage bag.

2. The trash bin of claim 1, wherein:

the rear bag-holder and the door bag-holder are bars articulated at a top portion of opposite side walls and are swingable about parallelly extending axes between a garbage-bag clamping position and a bag releasing position, in the garbage-bag clamping position, the rear bag-holder bar bears over top portions of the respective side walls and the door bag-holder bar bears over a top portion of the front door and is configurable for clamping portions of an opening of a garbage bag, and in the bag releasing position, the rear bag-holder and the door bag-holder are disposed to disengage from the respective top portion.

3. The trash bin of claim 1, wherein:

a garbage bag is securely disposed within the garbage space, with an opening of the garbage bag facing the bag holder opening, and a top edge of the garbage bag is clamped between at least portions of the bag mount and corresponding at least portions of the bag clamping arrangement.

4. The trash bin of claim 1, wherein a friction path extends between a bag mount and portions of the bag holding arrangement, so as to grip a garbage bag disposed within said path and prevent spontaneous sliding displacement thereof.

5. The trash bin of claim 1, wherein the bag holder is pivotally articulable at a top portion of the body.

6. The trash bin of claim 1, wherein the lid assembly further comprises a lid displaceable over the bag holder, between a closed position wherein the bag holder opening is closed, and an open position wherein the garbage space is accessible.

7. The trash bin of claim 1, wherein one or both of the bag mount and the bag holder are configured with one or more garbage bag grips.

8. The trash bin of claim 1, wherein at the closed position of the front door the bag mount of the side walls and the bag mount of the front door coextend.

9. The trash bin of claim 1, wherein at a closed position of the front door the bag mount assumes an annular frame shape.

10. The trash bin of claim 1, wherein the bag clamping arrangement of the bag holder is configured as a bag arresting lip, corresponding with a bearing lip of the bag mount.

11. The trash bin of claim 1, wherein at the bag holding position the bag holder opening of the bag holder is disposed over the top opening of the body, facilitating access into the garbage space.

12. The trash bin of claim 1, wherein the bag mount and the bag clamping arrangement are continuous or intermittent.

13. The trash bin of claim 1, wherein the bag mount is integral or integrated with respective top portion of the side walls and a top portion of the front door.

14. The trash bin of claim 1, wherein the rear bag-holder and the door bag-holder are pivotally articulated to the side walls about parallel axes extending parallel with the front door.

15. The trash bin of claim 1, wherein a top portion of the side walls and a top portion of the front door are configured with a rim for accommodating the rear bag-holder and the door bag-holder at their garbage-bag clamping position.

16. The trash bin of claim 1, wherein one or both of the rear bag-holder, the door bag-holder and the top rim of the side walls and the front door are configured with a garbage bag friction enhancing arrangement.

17. The trash bin of claim 1, wherein the front door is openable only after opening the lid.

18. The trash bin of claim 1, being a pedal bin and wherein the lid is displaceable into the open position by a foot operated pedal mechanism articulated to the lid.

19. The trash bin of claim 1, wherein at a closed position the lid is nested within a shoulder of the top edge of the side walls and front door.

20. The trash bin of claim 1, wherein at the closed position the lid bears over the rear bag-holder and the door bag-holder, applying pressure thereover.

* * * * *